(12) United States Patent
Lee et al.

(10) Patent No.: US 12,498,346 B2
(45) Date of Patent: Dec. 16, 2025

(54) SEMICONDUCTOR STRUCTURE HAVING BIOSENSOR AND MANUFACTURING METHOD THEREOF

(71) Applicant: Taiwan Semiconductor Manufacturing Company, Ltd., Hsinchu (TW)

(72) Inventors: Wei Lee, Hsinchu (TW); Katherine H Chiang, New Taipei (TW); Pei-Wen Liu, Hsinchu (TW); Ke-Wei Su, Hsinchu County (TW); Kuan-Lun Cheng, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 744 days.

(21) Appl. No.: 17/840,643

(22) Filed: Jun. 15, 2022

(65) Prior Publication Data

US 2023/0408443 A1    Dec. 21, 2023

(51) Int. Cl.
    *G01N 27/414*     (2006.01)

(52) U.S. Cl.
    CPC ..... *G01N 27/4145* (2013.01); *G01N 27/4148* (2013.01)

(58) Field of Classification Search
    CPC ............... G01N 27/4145; G01N 27/4148
See application file for complete search history.

(56) References Cited

U.S. PATENT DOCUMENTS

| | | | |
|---|---|---|---|
| 2006/0197118 A1* | 9/2006 | Migliorato | G01N 33/54373 257/253 |
| 2010/0248284 A1* | 9/2010 | Chen | G01N 33/5438 422/82.01 |
| 2013/0320556 A1* | 12/2013 | Liu | H01L 24/03 438/455 |
| 2013/0341734 A1* | 12/2013 | Merz | G01N 27/4148 438/49 |
| 2014/0151755 A1* | 6/2014 | Liu | H10D 84/83 438/48 |
| 2014/0225166 A1* | 8/2014 | Ellis-Monaghan | H10D 30/021 257/253 |
| 2020/0173958 A1* | 6/2020 | Chiang | G01N 33/5438 |

* cited by examiner

*Primary Examiner* — Teresa M. Arroyo
(74) *Attorney, Agent, or Firm* — JCIPRNET

(57) ABSTRACT

A semiconductor structure includes a sensor, a patterned dielectric layer, and a cover disposed on the patterned dielectric layer. The sensor includes a bio-sensing device and at least one voltage-reference device disposed in proximity to the bio-sensing device. The bio-sensing device includes a first field effect transistor (FET) and a first sensing portion of a sensing film capacitively coupled to the first FET, and the first sensing portion is concave toward the first FET. The at least one voltage-reference device includes a second FET and a second sensing portion of the sensing film capacitively coupled to the second FET. The patterned dielectric layer is disposed on the sensing film and includes at least one sensing well located above the at least one voltage-reference device and the bio-sensing device. The cover includes fluid channels communicating with the at least one sensing wells.

20 Claims, 18 Drawing Sheets

SEMICONDUCTOR STRUCTURE HAVING BIOSENSOR AND MANUFACTURING METHOD THEREOF

BACKGROUND

Biosensors are devices for sensing and detecting biomolecules and operate on the basis of electronic, electrochemical, optical, and mechanical detection principles. Biosensors that include transistors are sensors that electrically sense charges, photons, and mechanical properties of bio-entities or biomolecules. The detection can be performed by detecting the bio-entities or biomolecules themselves, or through interaction and reaction between specified reactants and bio-entities/biomolecules. Such biosensors can be manufactured using semiconductor processes, can quickly convert electric signals, and can be easily applied to integrated circuits (ICs) and Micro-Electro-Mechanical Systems (MEMS). Currently, reliability of the bio-MEMS devices can be a challenge because of sensitivity issues of the bio-MEMS devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1-14A are schematic cross-sectional views illustrating various stages of a manufacturing method of a semiconductor structure, in accordance with some embodiments.

DETAILED DESCRIPTION

Figure 1:
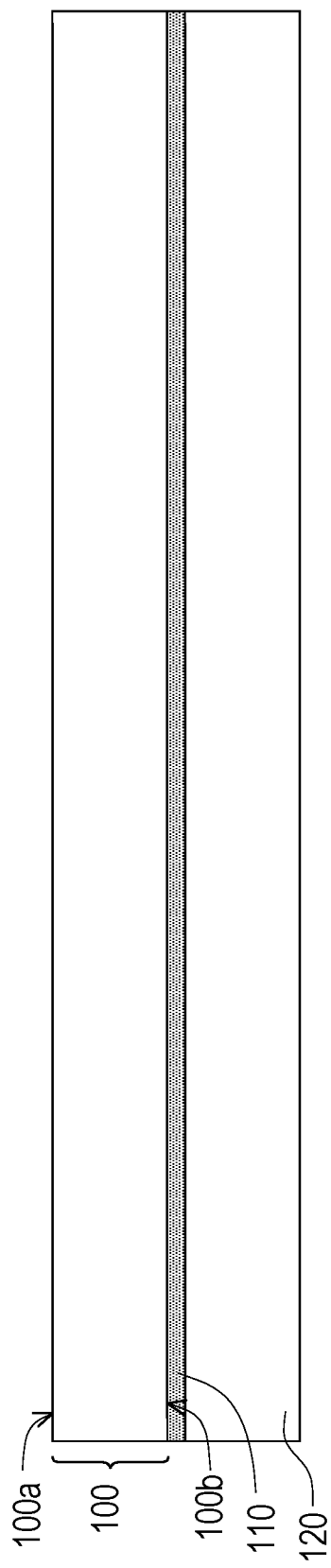

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless defined otherwise, all technical and scientific terms used herein have the same meanings as commonly understood by one of ordinary skill in the art to which this disclosure belongs. Although any methods and materials similar or equivalent to those described herein can be used in the practice or testing of embodiments in accordance with the disclosure; the methods, devices, and materials are now described.

Figure 13:
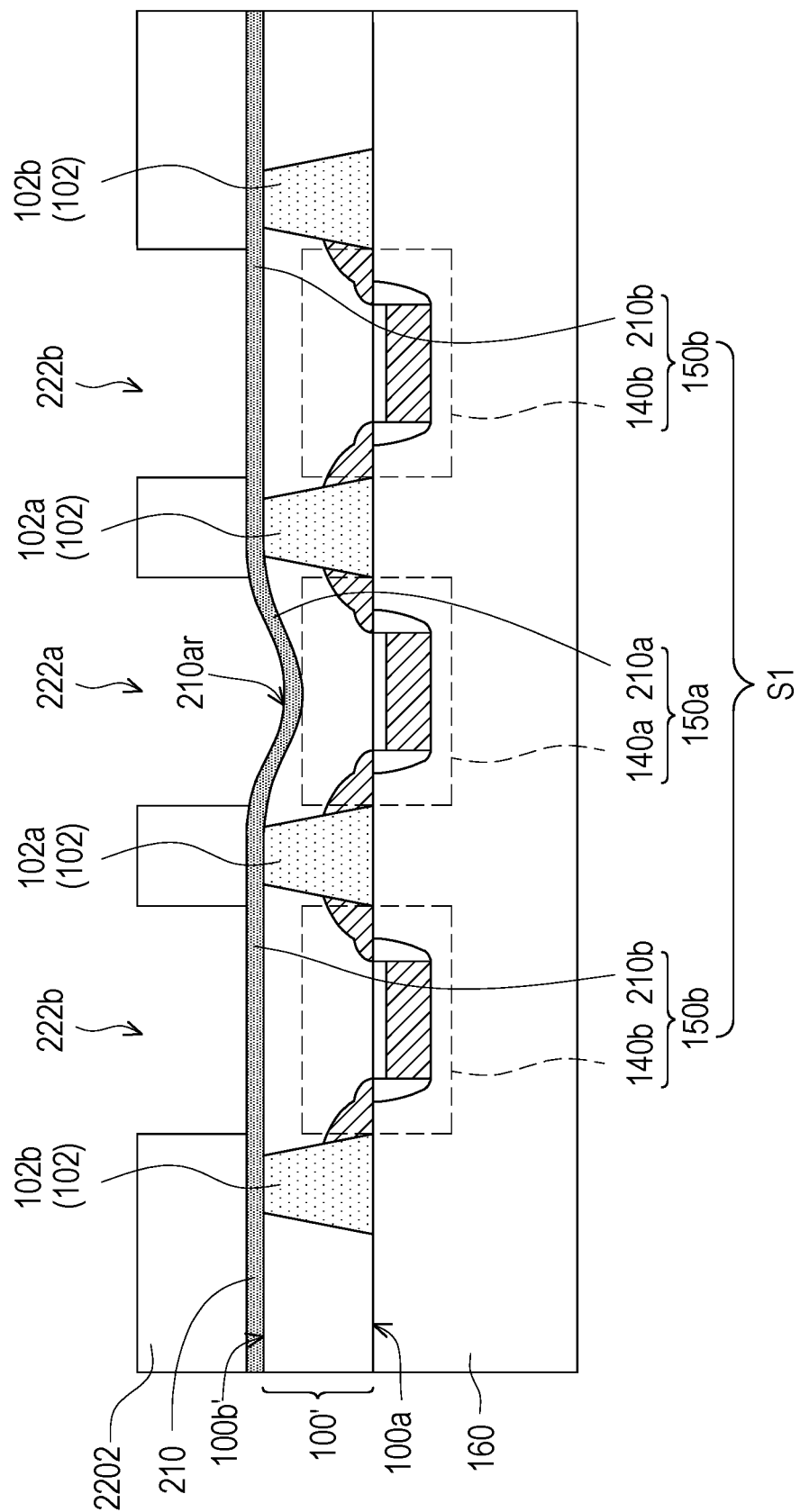
Figure 14A:
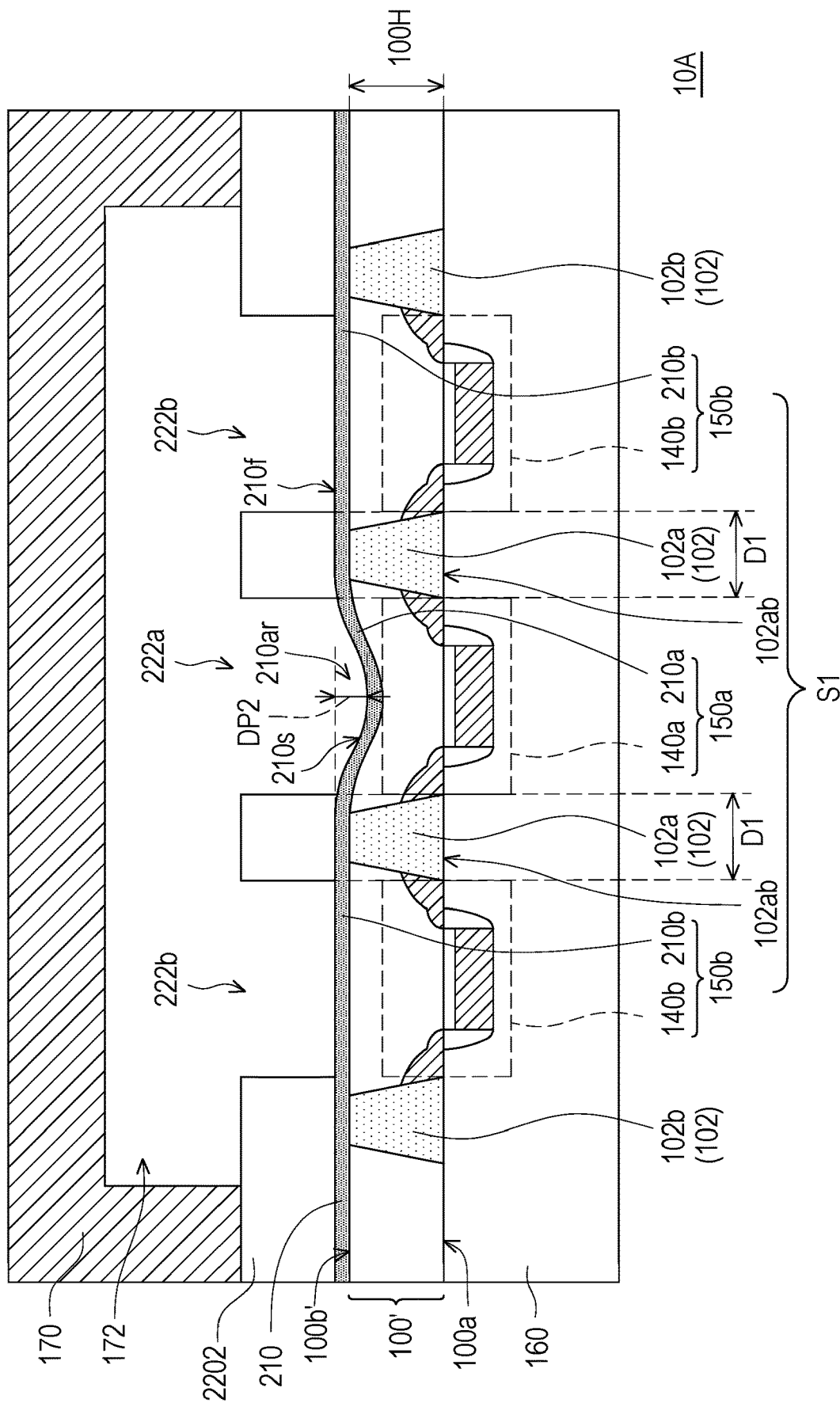
Figure 14B:
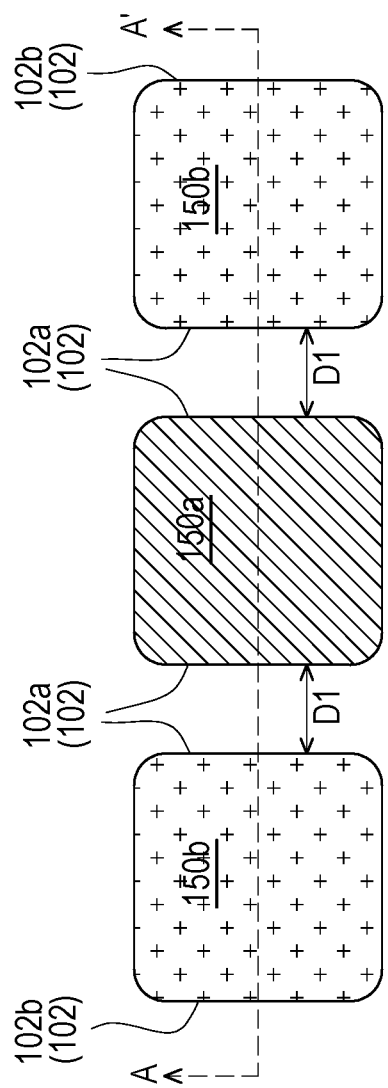
FIGS. 14B-14C are schematic and simplified top views illustrating various configuration of the structure of FIG. 14A, in accordance with some embodiments.
Figure 14C:
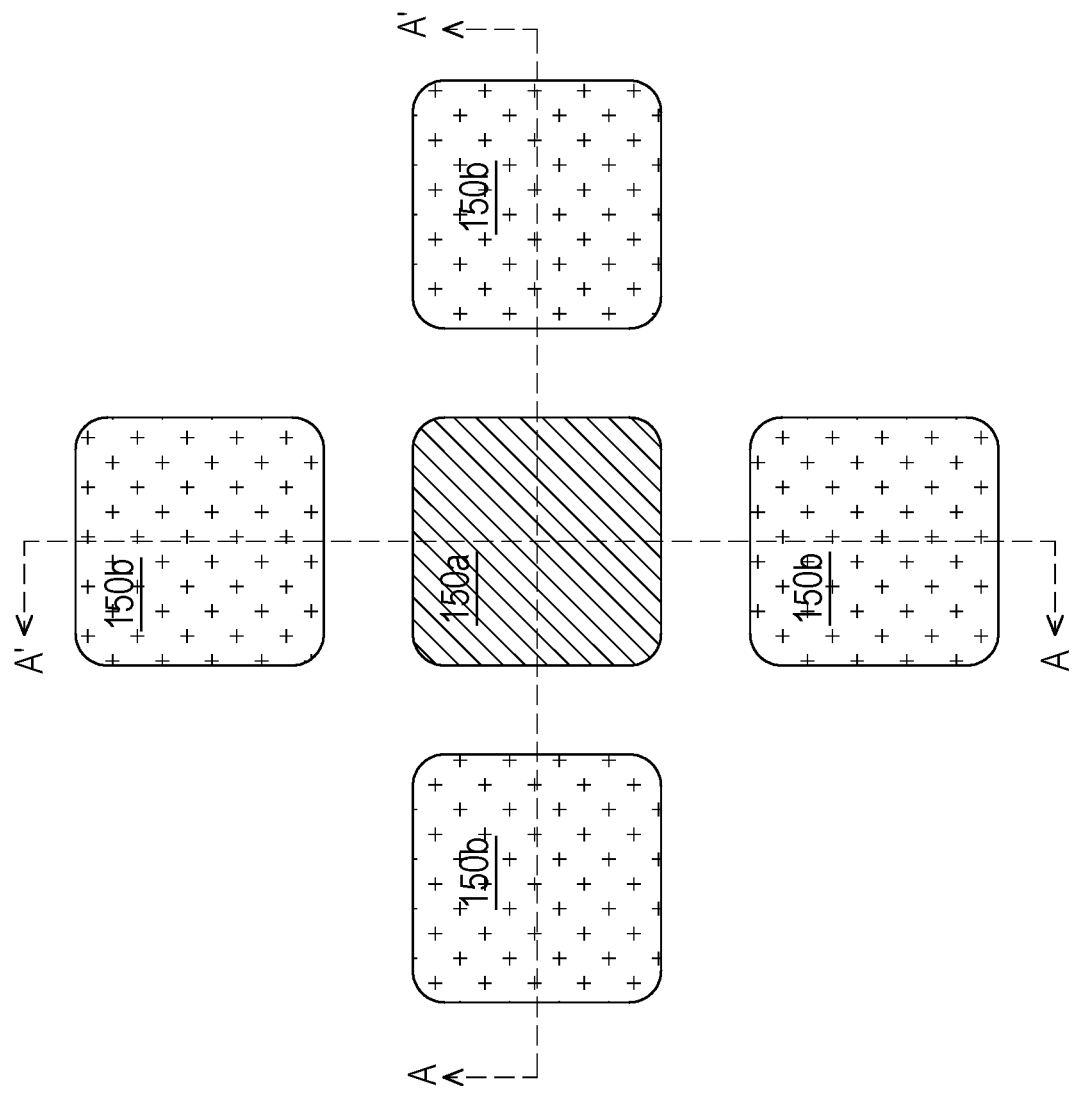

FIGS. 1-14A are schematic cross-sectional views illustrating various stages of a manufacturing method of a semiconductor structure, and FIGS. 14B-14C are schematic and simplified top views illustrating various configuration of the structure of FIG. 14A, in accordance with some embodiments.

Referring to FIG. 1, a sacrificial film 110 and a sacrificial dielectric layer 120 are provided on a semiconductor substrate 100. In some embodiments, the semiconductor substrate 100, the sacrificial film 110, and the sacrificial dielectric layer 120 are provided and collectively viewed as a silicon-on-insulator (SOI) substrate. In some embodiments, the sacrificial film 110 and the sacrificial dielectric layer 120 are sequentially formed on the semiconductor substrate 100. The semiconductor substrate 100 may include a first surface 100a and a second surface 100b opposite to each other. In some embodiments, the first surface 100a is a front-side surface of the semiconductor substrate 100, and the second surface 100b is a back-side surface of the semiconductor substrate 100. The semiconductor substrate 100 may include a crystalline silicon wafer. In some embodiments, the semiconductor substrate 100 is made of suitable elemental semiconductor, such as diamond or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide.

The sacrificial film 110 is disposed between the semiconductor substrate 100 and the sacrificial dielectric layer 120. For example, the sacrificial film 110 and the sacrificial dielectric layer 120 are formed on the second surface 100b of the semiconductor substrate 100 through a chemical vapor deposition (CVD) process, a physical vapor deposition (PVD) process or other suitable deposition process. For example, the material of the sacrificial film 110 includes $HfO_2$, $SiO_2$, SiON, SiN, or other suitable dielectric materials. The material of the sacrificial dielectric layer 120 may include a silicon dioxide layer, a silicon nitride layer, or other suitable dielectric layer.

Figure 2:
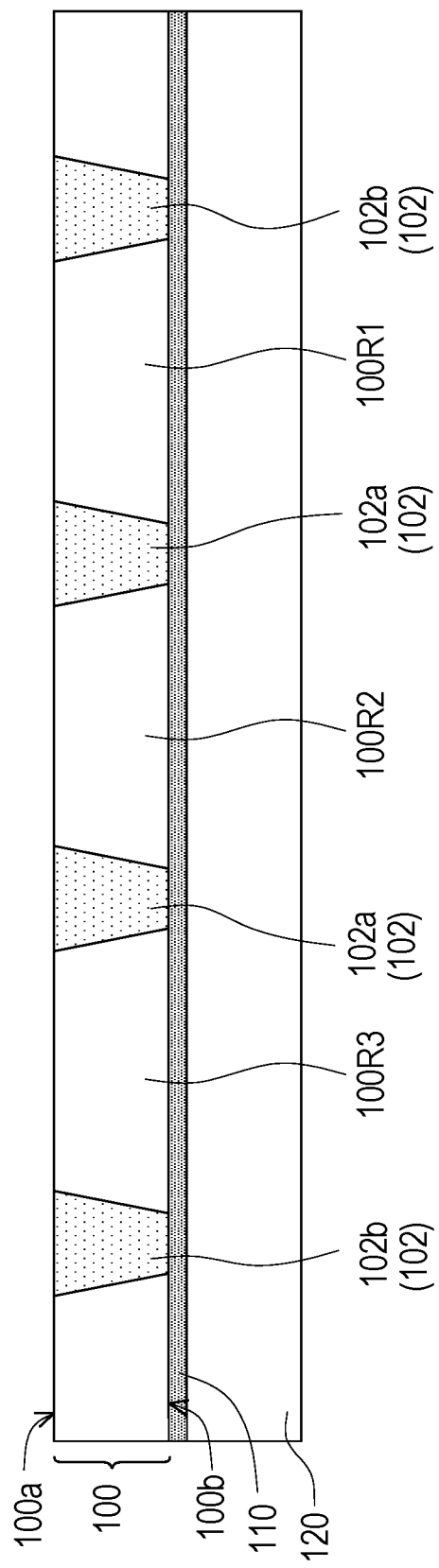

Referring to FIG. 2, isolation structures 102 (e.g., 102a and 102b) are formed in the semiconductor substrate 100. Each isolation structure 102 may extend from the first surface 100a of the semiconductor substrate 100 to the second surface 100b of the semiconductor substrate 100. For example, each isolation structure 102 penetrates through the semiconductor substrate 100. The top ends of the isolation structures 102 may be accessibly revealed from the first surface 100a of the semiconductor substrate 100. In some embodiments, the top ends of the isolation structures 102 are substantially leveled with the first surface 100a of the semiconductor substrate 100. The bottom ends of the isolation structures 102 may be in direct contact with the sacrificial film 110. In some embodiments, the isolation structures 102 are tapered toward the sacrificial film 110. The lateral dimension (e.g., width) of the top end of the isolation structure 102 may be greater than the lateral dimension of the bottom end of the isolation structure 102. The isolation structures 102 may each have a tapered profile in the cross-sectional view.

The isolation structures 102 (e.g., 102a and 102b) may be or may include shallow trench isolation (STI) structures. In an embodiment where the isolation structures 102 include STI structures, trenches are formed in the semiconductor substrate 100, and a dielectric material are deposited over the semiconductor substrate 100, and a planarization process is then performed to remove the excess dielectric material (e.g., the dielectric material located outside the trenches). The planarization process may be or include a chemical mechanical polishing (CMP) process), a mechanical grinding process, an etch process, or combinations thereof. In some other embodiments, not shown in figures, the isolation structures 102 (e.g., 102a and 102b) include local oxidation of silicon (LOCOS) structures. In an embodiment where the isolation structures 102 include LOCOS structures, a patterned mask layer is formed over the first surface 100a of the semiconductor substrate 100, and a thermal process is performed to oxidize the portions of the semiconductor substrate 100 which are revealed by the patterned mask layer. The patterned mask layer may include a pad layer (e.g., a pad oxide layer) and a hard mask layer (e.g., a silicon nitride layer) stacked over the pad layer, and the thermal process may include a thermal oxidation process (e.g., a rapid thermal annealing process).

In some embodiments, a first region 100R1 of the semiconductor substrate 100 is between the isolation structures 102a and 102b, a second region 100R2 of the semiconductor substrate 100 is insulated and separated from the first region 100R2 by the isolation structures 102a, and a third region 100R3 of the semiconductor substrate 100 is insulated and separated from the second region 100R2 by the isolation structures 102a and is between the isolation structures 102a and 102b. In the cross-sectional view, the first region 100R1 and the third region R3 are located at opposing sides of the second region 100R2. In some embodiments, the isolation structures 102a encircles the second region 100R2, and the isolation structures 102a may be disposed on opposing sides of the second region 100R2 in the cross-sectional view. In some embodiments, the lateral dimensions of the first region 100R1, the second region 100R2, and the third region 100R3 are substantially identical to each other. The first region 100R1, the second region 100R2, and the third region 100R3 of the semiconductor substrate 100 may be oxide defined (OD) regions for formation of a sensing device. The details of the formation of the sensing device are described below.

Figure 3:
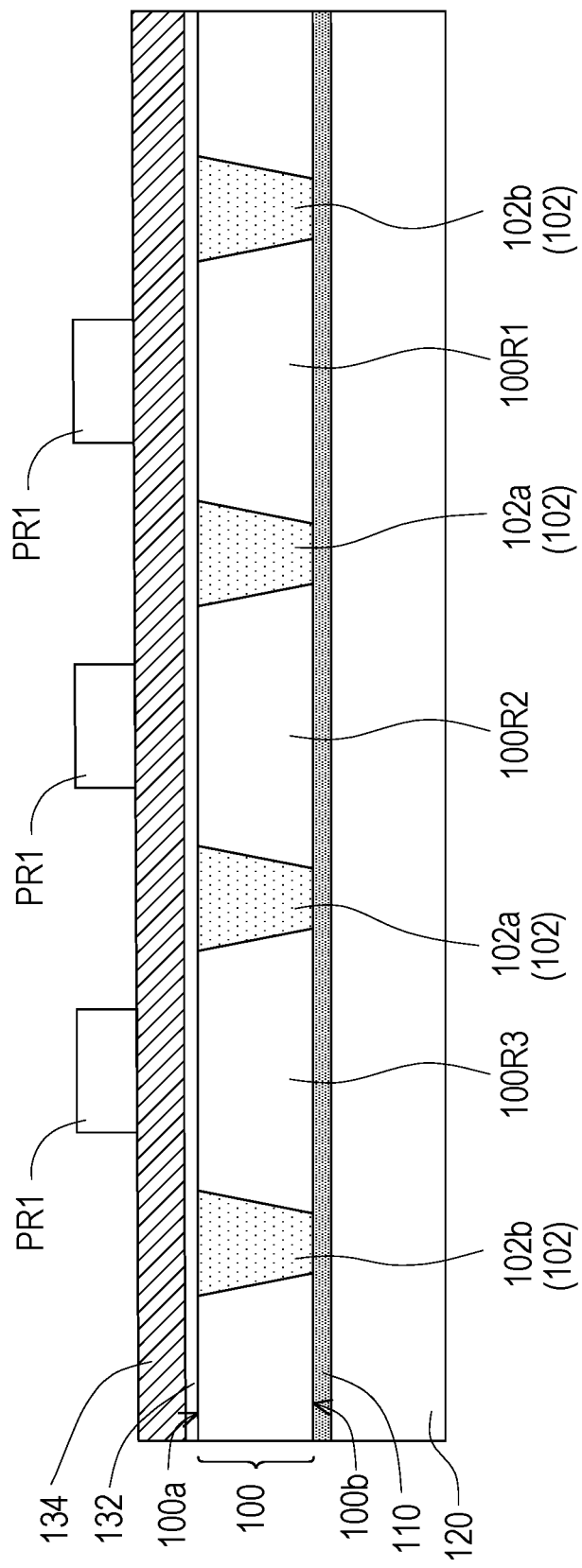

Referring to FIG. 3, a gate dielectric material layer 132, a conductive material layer 134, and a patterned photoresist layer PR1 are sequentially formed over the first surface 100a of the semiconductor substrate 100. The patterned photoresist layer PR1 covers portions of the conductive material layer 134 which are located above the first region 100R1, the second region 100R2, and the third region 100R3. The gate dielectric material layer 132 and the conductive material layer 134 may be formed by deposition processes, such as CVD, PVD, or other suitable deposition processes. The material of the gate dielectric material layer 132 may be (or include) $SiO_2$, SiON, SiN, or other suitable dielectric materials. The material of the conductive material layer 134 may be or include Hf, Al, Ta, Ti, La, O, N, C, Au, Ag, Pt, Co, Ni, Sn, Sb, Ga, In, Ge, Bi, or other suitable conductive materials. The gate dielectric material layer 132 and the conductive material layer 134 may be deposited to cover the first surface 100a of the semiconductor substrate 100. The patterned photoresist layer PR1 may be formed over the conductive material layer 134 by spin-coating, soft baking, exposure, development, hard baking, cleaning, and/or any suitable process.

Figure 4:
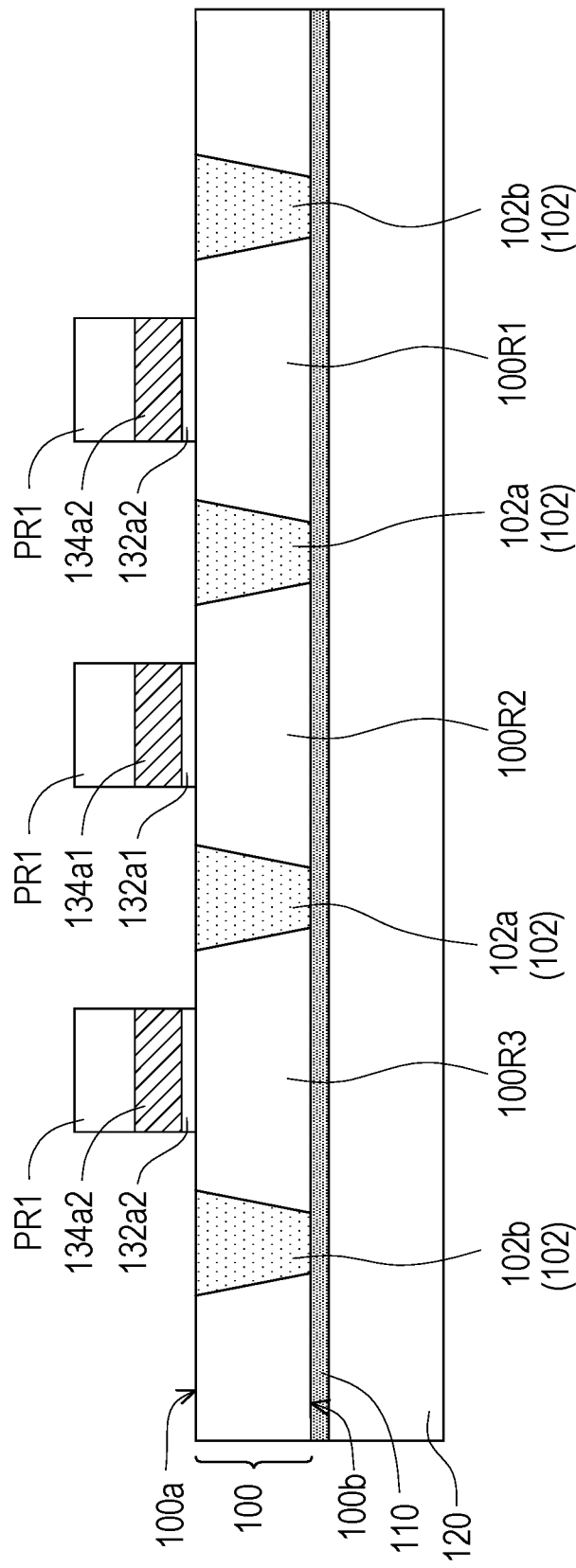

Referring to FIG. 4 and with reference to FIG. 3, a patterning process may be performed to remove portions of the conductive material layer 134 and the gate dielectric material layer 132 which are not covered by the patterned photoresist layer PR1 until the first surface 100a of the semiconductor substrate 100 and the top surfaces (e.g., the wider ends) of the isolation structures 102 (e.g., 102a and 102b) are accessibly revealed. In some embodiments, an etching process (e.g., a single etching step or multiple etching steps) is performed to remove the portions of the conductive material layer 134 and the gate dielectric material layer 132 which are not covered by the patterned photoresist layer PR1. After the patterning process of the conductive material layer 134 and the gate dielectric material layer 132 is performed, gate dielectric layers 132a1 and 132a2 as well as gate electrodes 134a1 and 134a2 are formed, where the gate dielectric layer 132a1 and the gate electrode 134a1 are stacked over the second region 100R2 of the semiconductor substrate 100, the gate dielectric layer 132a2 and the gate electrode 134a2 are stacked over the first region 100R1 and also stacked over the third region 100R3 of the semiconductor substrate 100.

Figure 5:
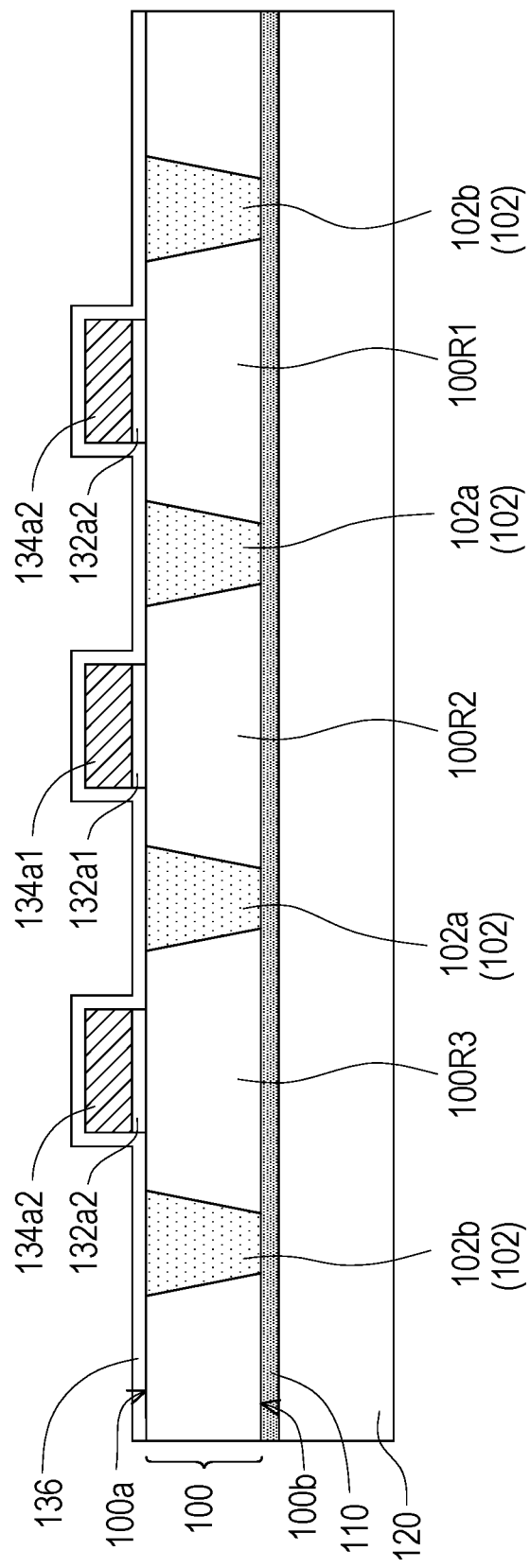

Referring to FIG. 5 and with reference to FIG. 4, the patterned photoresist layer PR1 is removed from the gate electrodes 134a1 and 134a2 through, e.g., a stripping process or other suitable removal process. Once the gate electrodes 134a1 and 134a2 are accessibly revealed, a dielectric material layer 136 may be formed over the first surface 100a of the semiconductor substrate 100 to conformally cover the gate dielectric layers 132a1 and 132a2 as well as the gate electrodes 134a1 and 134a2. The material of the dielectric material layer 136 may be or include silicon oxide, silicon nitride, silicon oxynitride, or other suitable dielectric materials.

Figure 6:
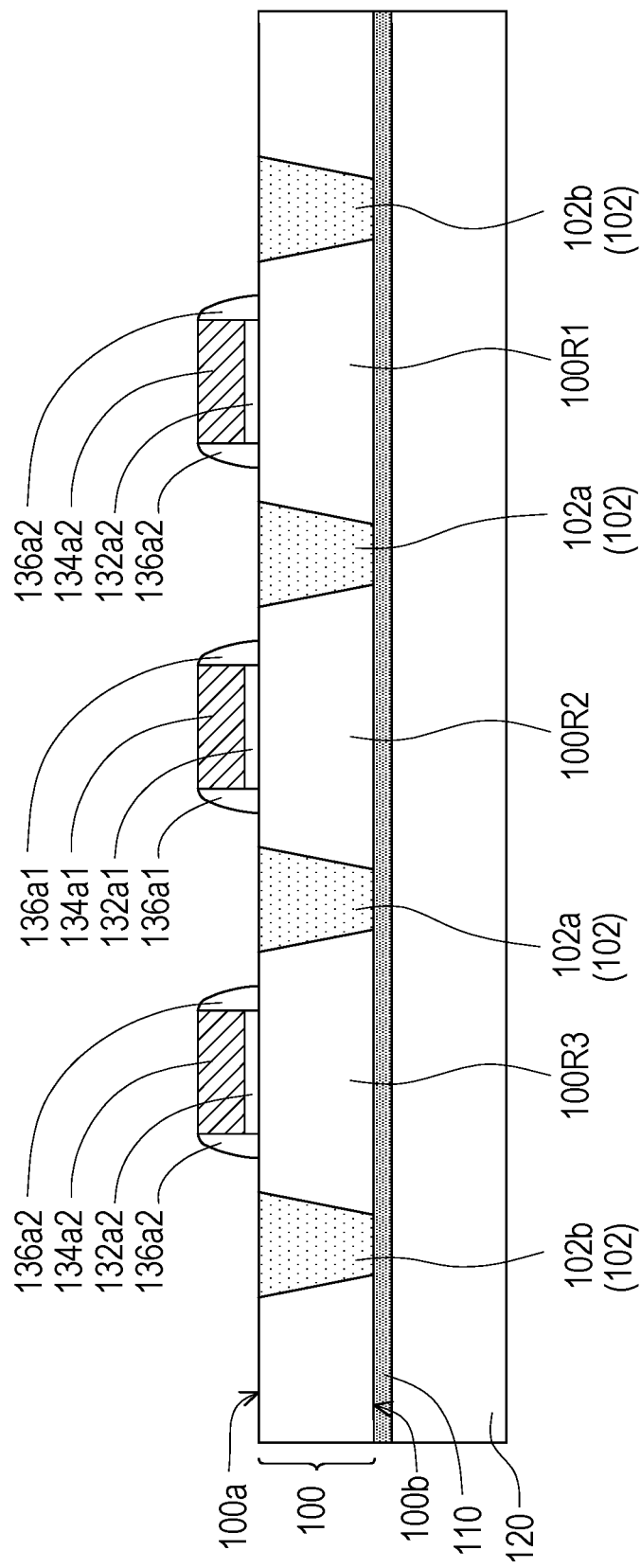

Referring to FIG. 6 and with reference to FIG. 5, a removal process is performed to partially remove the dielectric material layer 136 until the first surface 100a of the semiconductor substrate 100, the top ends of the isolation structures 102a and 102b, and the top surfaces of the gate electrodes 134a1 and 134a2 are accessibly revealed. After performing the removal process of the dielectric material layer 136, a pair of gate spacers 136a1 is formed over the second region 100R2, another pair of gate spacers 136a2 is formed over the first region 100R1, and the other pair of gate spacers 136a2 is formed over the third region 100R3. The pairs of gate spacers 136a1 covers sidewalls of the gate dielectric layer 132a1 and the gate electrode 134a1, and the pairs of gate spacers 136a2 covers sidewalls of the gate dielectric layer 132a2 and the gate electrode 134a2.

Figure 7:
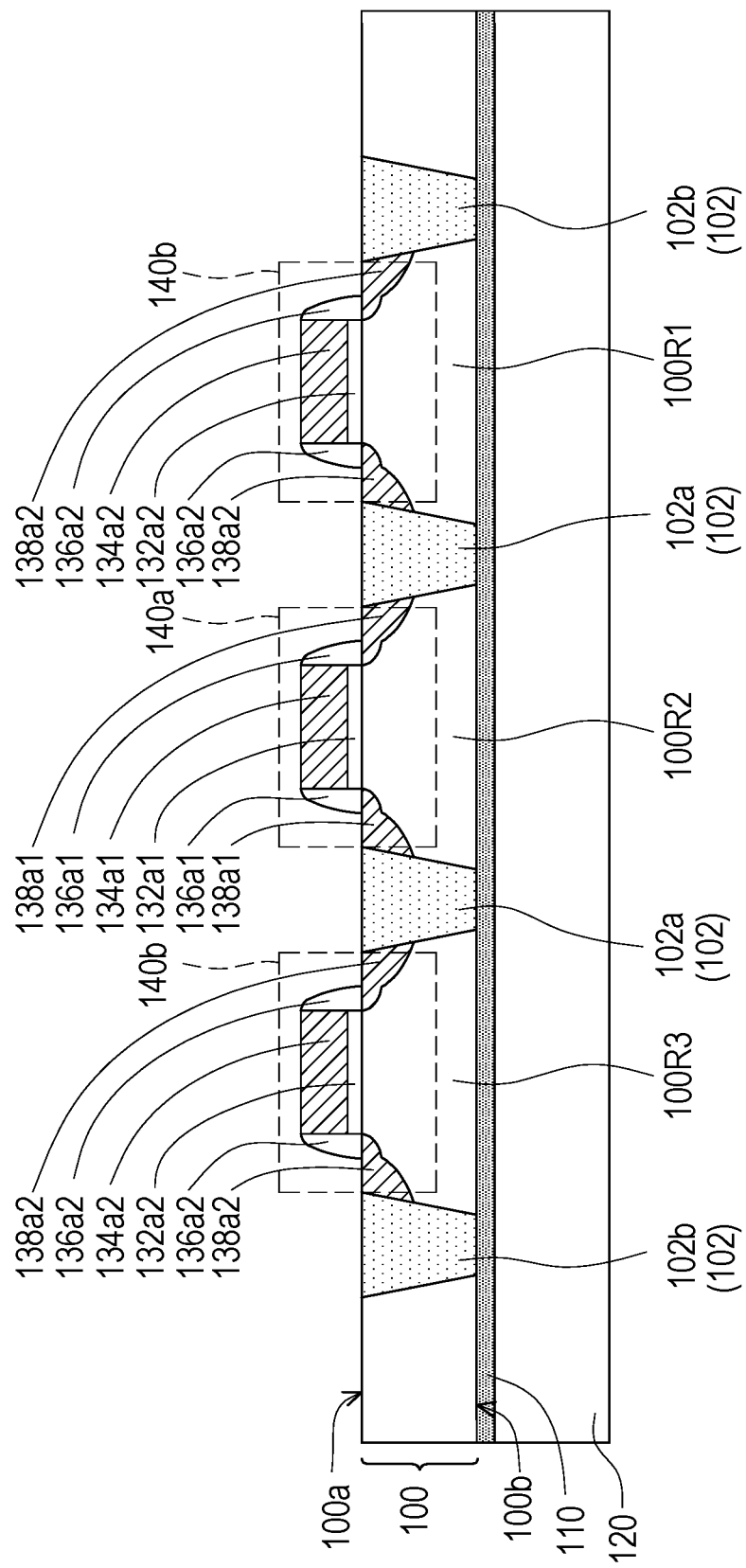

Referring to FIG. 7, source/drain (S/D) regions 138a1 are formed in the second region 100R2 of the semiconductor substrate 100, and S/D regions 138a2 are respectively formed in the first region 100R1 and the third region 100R3 of the semiconductor substrate 100. S/D region(s), as used herein, may refer to a source or a drain, individually or collectively dependent upon the context. For example, the S/D regions 138a1 formed in the second region 100R2 are coupled to the inner sidewalls 102ai of the isolation structure 102a, the S/D regions 138a2 formed in the first region 100R1 are coupled to the outer sidewall 102ao of the isolation structure 102*a* and the inner sidewall 102*bi* of the isolation structure 102*b*, and the S/D regions 138*a*2 formed in the third region 100R3 are also coupled to the outer sidewall 102*ao* of the isolation structure 102*a* and the inner sidewall 102*bi* of the isolation structure 102*b*. The S/D regions 138*a*1 and 138*a*2 may be doped with p-type dopants, such as boron or $BF_2$; n-type dopants, such as phosphorus or arsenic; and/or combinations thereof.

For example, the gate electrode 134*a*1 and the S/D regions 138*a*1 collectively configure as a first Field Effect Transistors (FET) 140*a*, and the gate electrode 134*a*2 and the S/D regions 138*a*2 collectively configure as a second FET 140*b*. The S/D regions 138*a*1 and 138*a*2 may be configured for n-type FETs and/or p-type FETs. A common type of FET is referred to as a metal oxide semiconductor field effect transistor (MOSFET). MOSFETs have been planar structures built in and on the planar surface of a substrate such as a semiconductor wafer. But recent advances in semiconductor manufacturing have resulted in three-dimensional, of fin-based, MOSFET structures.

Figure 8:
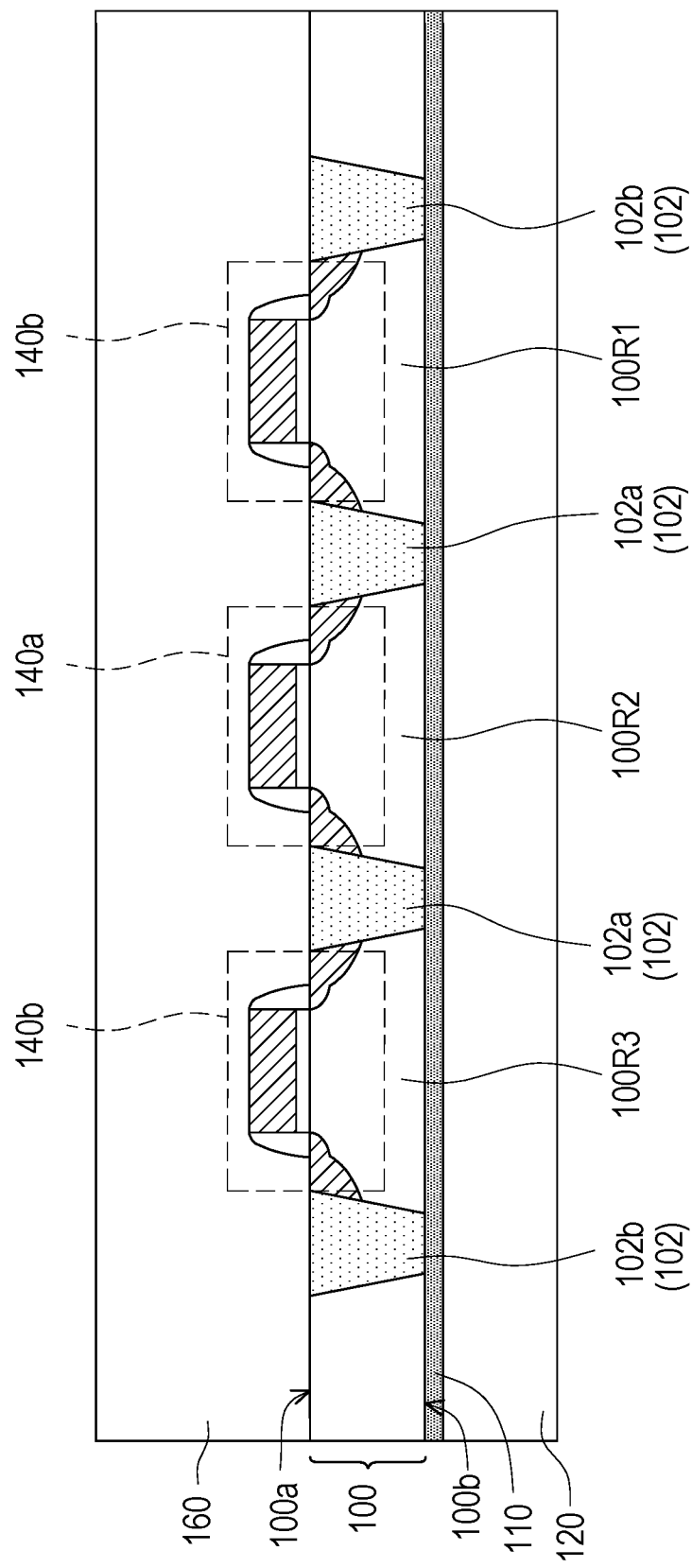

Referring to FIG. 8, after forming the first FET 140*a* and the second FETs 140*b*, an interconnect structure 160 may be formed on the first surface 100*a* of the semiconductor substrate 100. The interconnect structure 160 may be formed through Back-End of Line (BEOL) processes. The interconnect structure 160 may include one or more dielectric layers (e.g., one or more interlayer dielectric (ILD) layers, inter-metal dielectric (IMD) layers, or the like) and interconnect conductors (not individually shown) embedded in the one or more dielectric layers, where the interconnect conductors are electrically connected to the semiconductor devices (e.g., the first FET 140*a* and the second FETs 140*b*). The material of the dielectric layers of the interconnect structure 160 may include silicon oxide, silicon nitride, silicon oxynitride, or other suitable dielectric material. The interconnect conductors of the interconnect structure 160 may include metallic conductors. For example, the interconnect conductors include copper conductors, copper pads, aluminum pads or combinations thereof.

Figure 9:
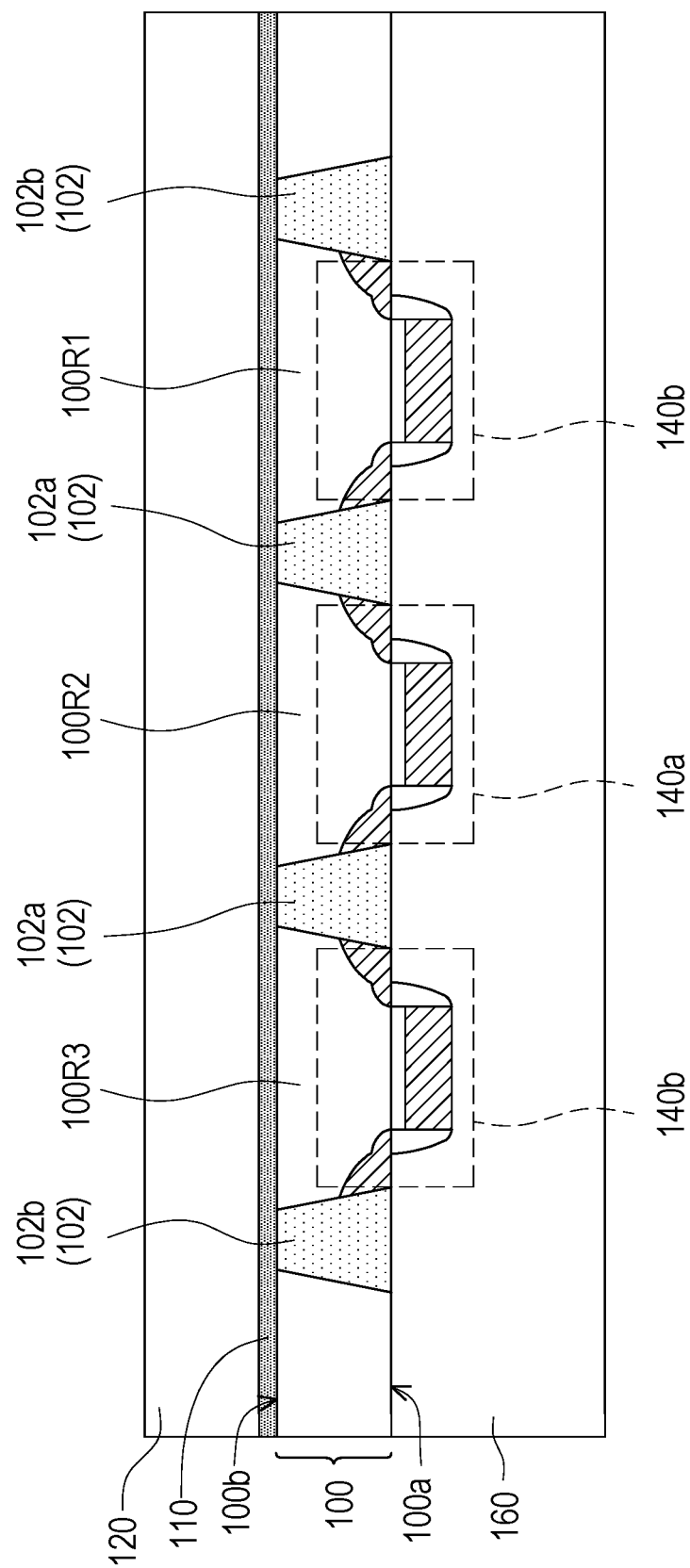
Figure 10:
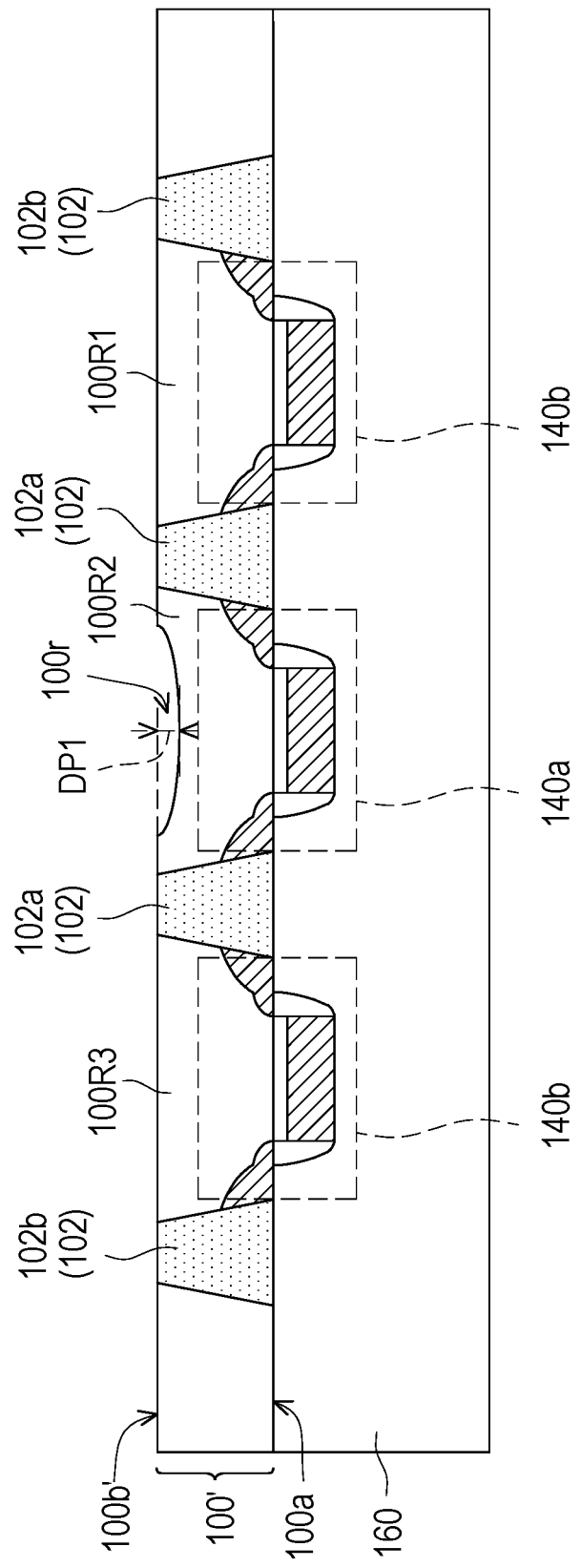

Referring to FIGS. 9-10 and with reference to FIG. 8, the resulted structure illustrated in FIG. 8 may be flipped upside down so that the sacrificial dielectric layer 120 may face upwardly for further processing. Next, the sacrificial dielectric layer 120 and the underlying sacrificial film 110 may be removed to accessibly expose the second surface 100*b* of the semiconductor substrate 100 through, e.g., etching or any suitable removal process. Subsequently, a portion of the semiconductor substrate 100 is removed to form a semiconductor substrate 100' having a dent portion 100*r* recessed into the second surface 100*b*'. For example, the dent portion 100*r* has a recess (or pit) less than the full horizontal thickness of the semiconductor substrate 100'. In some embodiments, the dent portion 100*r* has a substantially circular top-view shape; however, the dent portion 100*r* may be arranged to form a rectangular, oval, square, polygon, or other shape from the top view.

In some embodiments, a patterned mask layer having an opening (not shown) is formed on the second surface 100*b* of the semiconductor substrate 100, and then an etching process (e.g., wet etching) is performed to remove the portion of the semiconductor substrate 100 which is accessibly exposed by the opening of the patterned mask layer within the second region 100R2 to form the dent portion 100*r*, and subsequently, the patterned mask layer is removed to expose the second surface 100*b*' of the semiconductor substrate 100'. In some embodiments, the dent portion 100*r* is only located within the second region 100R2, and no recess (or pit) is included in the first region 100R1 and the third region 100R3. Alternatively, the first region 100R1 and/or the third region 100R3 may have the dent portions 100*r*.

In the cross section, the second surface 100*b*' of the semiconductor substrate 100' may include a curved (or concave) profile concave toward the first surface 100*a* and corresponding to the dent portion 100*r*, where a substantially flat surface of the second surface 100*b*' is connected to the curved profile. For example, the dent portion 100*r* has a maximum depth DP1 with respect to the substantially flat surface of the second surface 100*b*' of the semiconductor substrate 100', and the maximum depth DP1 may terminate at the bottommost point of the curved profile of the second surface 100*b*' of the semiconductor substrate 100', where the maximum depth DP1 is non-zero. The values of the maximum depth DP1 and the curvature of the curved profile are designed depending on product requirements.

Figure 11:
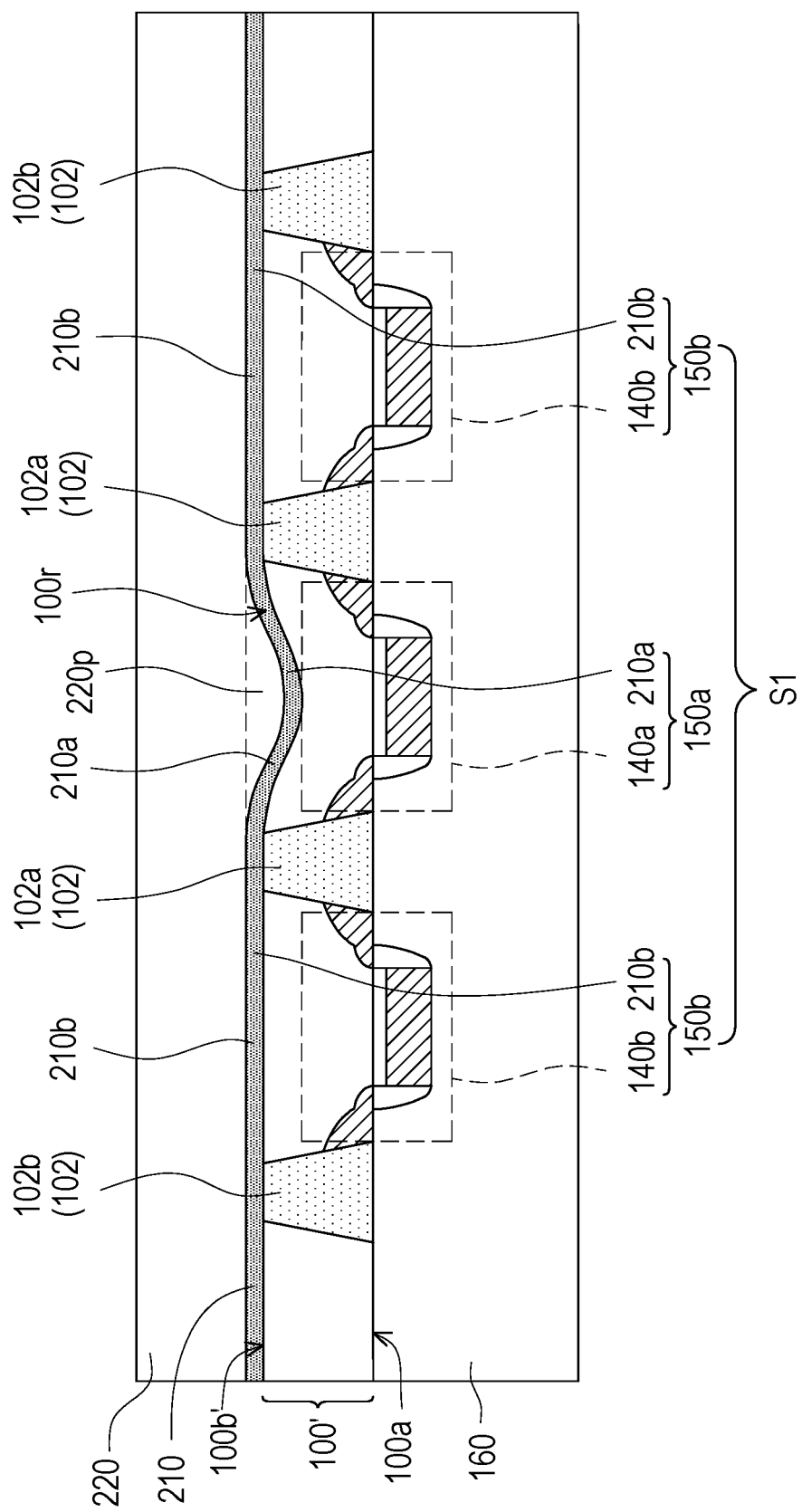

Referring to FIG. 11, a sensing film 210 and a dielectric layer 220 may be sequentially formed on the semiconductor substrate 100'. In some embodiments, the sensing film 210 is conformally formed on the second surface 100*b*' of the semiconductor substrate 100' by using suitable deposition process (e.g., CVD, PVD, etc.), and thus the sensing film 210 includes a curved (or concave) portion 210*a* covering the dent portion 100*r* on the second region 100R2 of the semiconductor substrate 100'. The sensing film 210 may include other portions 210*b* formed on the substantially flat surface of the second surface 100*b*' of the semiconductor substrate 100' corresponding to the first region 100R1 and the third region 100R3. For example, the material of the sensing film 210 includes $HfO_2$, $SiO_2$, SiON, SiN, or other suitable sensing materials. In some embodiments, the sensing film 210 includes multiple regions, and those regions of the sensing film 210 are formed by the same sensing material. Alternatively, the sensing film 210 includes regions formed by different sensing materials.

In some embodiments, the curved portion 210*a* of the sensing film 210 within the second region 100R2 is viewed as a first sensing portion 210*a*. The first sensing portion 210*a* and the first FET 140*a* including gate electrode 134*a*1 and the S/D regions 138*a*1 (labeled in FIG. 7) collectively configure as a bio-sensing device 150*a*, where first sensing portion 210*a* is capacitively coupled to the first FET 140*a*. In some embodiments, the other portions 210*b* on the substantially flat surface of the second surface 100*b*' of the semiconductor substrate 100' within the first region 100R1 and the third region 100R3 are viewed as second sensing portions 210*b*. Each second sensing portion 210*b* of the sensing film 210 and the underlying second FET 140*b* including gate electrode 134*a*2 and the S/D regions 138*a*2 (labeled in FIG. 7) collectively configure as a voltage-reference device 150*b*, where each second sensing portion 210*b* is capacitively coupled to the corresponding second FET 140*b*. The bio-sensing device 150*a* and the voltage-reference devices 150*b* are collectively configure as a sensor S1 (e.g., biosensor). Although a single sensor is illustrated, it should be understood that a biosensor may include more than two sensors arranged in array. In addition, each sensor may include at least one bio-sensing device and one or more voltage-reference device(s) disposed adjacent to the bio-sensing device.

With continued reference to FIG. 11, the sensing film 210 may be a layer of immobilized capture reagents that act as surface receptors to detect the presence of a target analyte of biological origin. As used herein, the term "immobilized" when used with respect to, e.g., a capture reagent, includes substantially attaching the capture reagent at a molecular level to a surface. For example, a capture reagent may be immobilized to a surface of the sensing layer using adsorption techniques including non-covalent interactions (e.g., electrostatic forces, van der Waals, and dehydration of hydrophobic interfaces) and covalent binding techniques where functional groups or linkers facilitate attaching the capture reagent to the surface of the sensing layer. Immobilizing a capture reagent to a surface of the sensing film may be based upon the properties of the surface, the medium carrying the capture reagent, and the properties of the capture reagent. In some cases, a surface of the sensing film may be first modified to have functional groups bound thereto. The functional groups may then bind to biomolecules or biological or chemical substances to immobilize them thereon.

As used herein, "capture reagent" is a molecule or compound capable of binding the target analyte or target reagent, which can be directly (or indirectly) attached to a substantially solid material. The capture reagent can be a chemical, and specifically any substance for which there exists a naturally occurring target analyte (e.g., an antibody, polypeptide, DNA, RNA, cell, virus, etc.) or for which a target analyte can be prepared, and the capture reagent can bind to one or more target analytes in an assay. The term "chemical" refers to a substance, compound, mixture, solution, emulsion, dispersion, molecule, ion, dimer, macromolecule such as a polymer or protein, biomolecule, precipitate, crystal, chemical moiety or group, particle, nanoparticle, reagent, reaction product, solvent, or fluid any one of which may exist in the solid, liquid, or gaseous state, and which is typically the subject of an analysis. The term "reaction" refers to a physical, chemical, biochemical, or biological transformation that involves at least one chemical and that generally involves (in the case of chemical, biochemical, and biological transformations) the breaking or formation of one or more bonds such as covalent, noncovalent, van der Waals, hydrogen, or ionic bonds. The term includes typical chemical reactions such as synthesis reactions, neutralization reactions, decomposition reactions, displacement reactions, reduction-oxidation reactions, precipitation, crystallization, combustion reactions, and polymerization reactions, as well as covalent and noncovalent binding, phase change, color change, phase formation, crystallization, dissolution, light emission, changes of light absorption or emissive properties, temperature change or heat absorption or emission, conformational change, and folding or unfolding of a macromolecule such as a protein.

The term "antibody", as used herein, refers to a polypeptide of the immunoglobulin family that is capable of binding a corresponding antigen non-covalently, reversibly, and in a specific manner. For example, a naturally occurring IgG antibody is a tetramer comprising at least two heavy (H) chains and two light (L) chains inter-connected by disulfide bonds. Each heavy chain is comprised of a heavy chain variable region (abbreviated herein as VH) and a heavy chain constant region. The heavy chain constant region is comprised of three domains, $CH_1$, $CH_2$ and $CH_3$. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, and FR4. The three CDRs constitute about 15-20% of the variable domains. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (Clq) of the classical complement system. (Kuby, Immunology, $4^{th}$ ed., Chapter 4. W. H. Freeman & Co., New York, 2000). The term "antibody" includes, but is not limited to, monoclonal antibodies, human antibodies, humanized antibodies, chimeric antibodies, and anti-idiotypic (anti-Id) antibodies (including, e.g., anti-Id antibodies to antibodies of the invention). The antibodies can be of any isotype/class (e.g., IgG, IgE, IgM, IgD, IgA and IgY), or subclass (e.g., IgGi, IgG2, IgG3, IgG4, IgA1 and IgA2).

The term "assay", as used herein, refers to a process or step involving the analysis of a chemical or a target analyte and includes, but is not limited to, cell-based assays, biochemical assays, high-throughput assays and screening, diagnostic assays, pH determination, nucleic acid hybridization assays, polymerase activity assays, nucleic acid and protein sequencing, immunoassays (e.g., antibody-antigen binding assays, ELISAs, and iqPCR), bisulfite methylation assays for detecting methylation pattern of genes, protein assays, protein binding assays (e.g., protein-protein, protein nucleic acid, and protein-ligand binding assays), enzymatic assays, coupled enzymatic assays, kinetic measurements (e.g., kinetics of protein folding and enzymatic reaction kinetics), enzyme inhibitor and activator screening, chemiluminescence and electrochemiluminescence assays, fluorescent assays, fluorescence polarization and anisotropy assays, absorbance and colorimetric assays (e.g., Bradford assay, Lowry assay, Hartree-Lowry assay, Biuret assay, and BCA assay), chemical assays (e.g., for the detection of environmental pollutants and contaminants, nanoparticles, or polymers), and drug discovery assays.

The term "target analyte", as used herein, is the substance to be detected in the test sample using embodiments in accordance with the present disclosure. The target analyte can be a chemical, and specifically any substance for which there exists a naturally occurring capture reagent (e.g., an antibody, polypeptide, DNA, RNA, cell, virus, etc.) or for which a capture reagent can be prepared, and the target analyte can bind to one or more capture reagents in an assay. "Target analyte" includes any antigenic substances, antibodies, and combinations thereof. The target analyte can include a protein, a peptide, an amino acid, a carbohydrate, a hormone, a steroid, a vitamin, a drug including those administered for therapeutic purposes as well as those administered for illicit purposes, a bacterium, a virus, and metabolites of or antibodies to any of the above substances.

The term "test sample", as used herein, means the composition, solution, substance, gas, or liquid containing the target analyte to be detected and assayed. The test sample can contain other components besides the target analyte, can have the physical attributes of a liquid, or a gas, and can be of any size or volume, including, e.g., a moving stream of liquid or gas. The test sample can contain any substances other than the target analyte as long as the other substances do not interfere with the binding of the target analyte with the capture reagent or the specific binding of the first binding member to the second binding member. Examples of test samples include, but are not limited to, naturally-occurring and non-naturally occurring samples or combinations thereof. Naturally-occurring test samples can be synthetic or synthesized. Naturally occurring test samples include body or bodily fluids isolated from anywhere in or on the body of a subject, including, but not limited to, blood, plasma, serum, urine, saliva or sputum, spinal fluid, cerebrospinal fluid, pleural fluid, lymph fluid, fluid of the respiratory, intestinal, and genitourinary tracts, tear fluid, saliva, breast milk, fluid from the lymphatic system, semen, intra-organ system fluid, ascitic fluid, tumor cyst fluid, amniotic fluid and combinations thereof, and environmental samples such as ground water or waste water, soil extracts, air, and pesticide residues or food-related samples.

The term "analysis", as used herein, refers to a process or step involving physical, chemical, biochemical, or biological analysis that includes, but is not limited to, characterization, testing, measurement, optimization, separation, synthesis, addition, filtration, dissolution, or mixing. The term "measurement" refers to the process of determining the amount, quantity, quality, or property of a target analyte based on its binding to a capture reagent. The term "detection" refers to the process of determining the presence or absence of a target analyte based on its binding to a capture reagent. Detection includes, but is not limited to, identification, measurement, and quantitation. Detected substances can include, e.g., nucleic acids (including DNA and RNA), hormones, different pathogens (including a biological agent that causes disease or illness to its host, such as a virus (e.g., H7N9 or HIV), a protozoan (e.g., Plasmodium-causing malaria), or a bacteria (e.g., *E. coli* or *Mycobacterium tuberculosis*)), proteins, antibodies, various drugs or therapeutics or other chemical or biological substances, including hydrogen or other ions, non-ionic molecules or compounds, polysaccharides, small chemical compounds such as chemical combinatorial library members, and the like. Detected or determined parameters may include, but are not limited to, e.g., pH changes, lactose changes, changing concentration, particles per unit time where a fluid flows over the device for a period of time to detect particles, e.g., particles that are sparse, and other parameters.

Still referring to FIG. 11, the dielectric layer 220 may be formed on the sensing film 210 and may fill the curved portion 210a of the sensing film 210 through any suitable deposition process (e.g., CVD, PVD, etc.). A planarization process (e.g., a CMP process, a mechanical grinding process, an etch process, or combinations thereof) is optionally performed to planarize the top surface of the dielectric layer 220. For example, the dielectric layer 220 includes a protruded portion 220p coupled to the curved portion 210a of the sensing film 210. In some embodiments, the dielectric layer 220 includes a silicon dioxide layer, a silicon nitride layer, or other suitable dielectric layer. The material of the dielectric layer 220 may be different from the underlying sensing film 210. In some embodiments, the dielectric layer 220 includes a high-k dielectric layer and/or a low-k dielectric layer. The term "high-k" used herein refers to a high dielectric constant that is greater than the dielectric constant of $SiO_2$ (i.e., greater than 3.9). The term "low-k" used herein refers to a low dielectric constant that is less than the dielectric constant of $SiO_2$ (i.e., less than 3.9).

Figure 12:
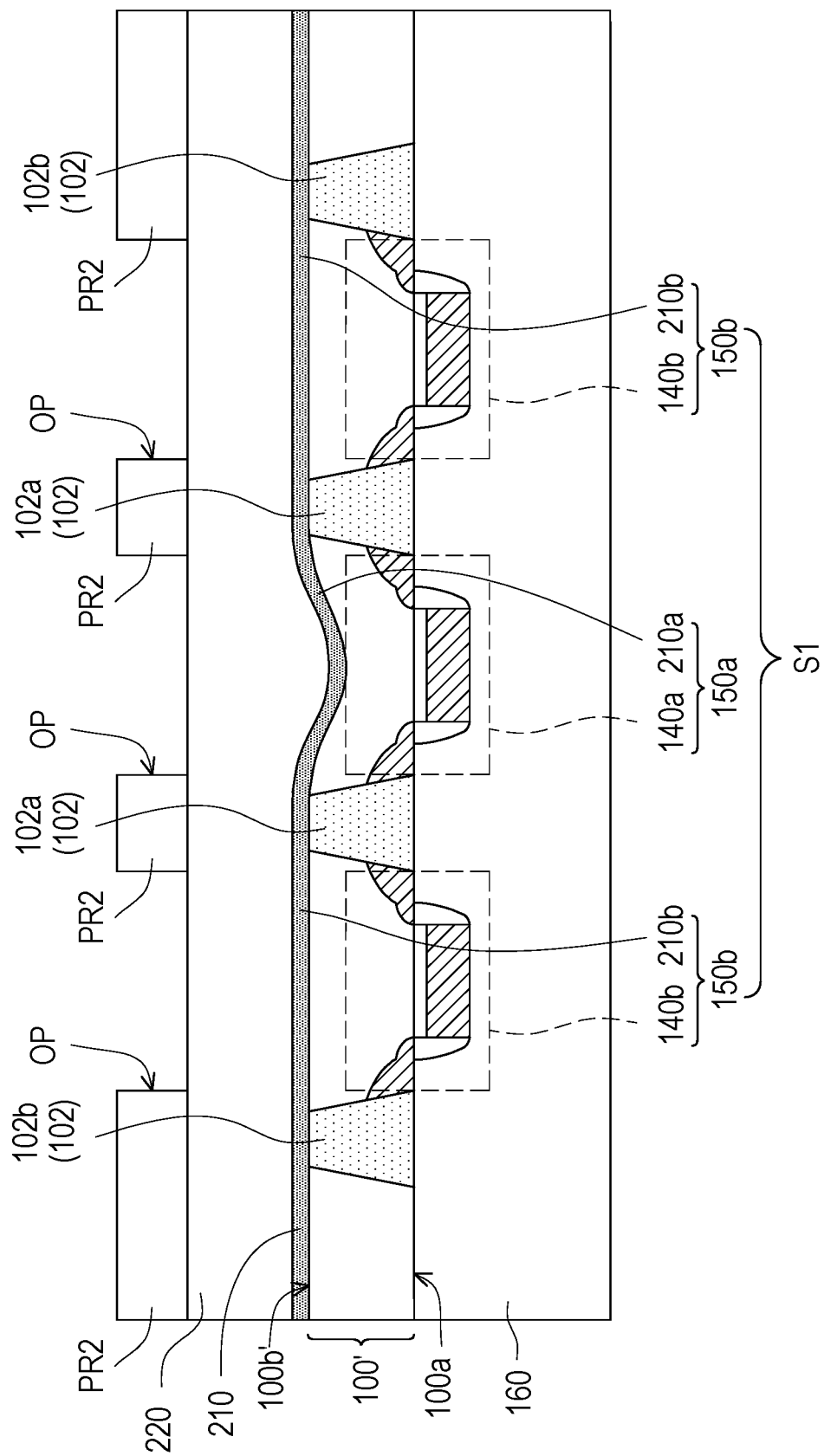

Referring to FIGS. 12-13, a patterned photoresist layer PR2 having the openings OP may be formed over the dielectric layer 220. Portions of the dielectric layer 220 may be revealed by the openings OP of the patterned photoresist layer PR2. The patterned photoresist layer PR2 may be formed over the dielectric layer 220 by spin-coating, soft baking, exposure, development, hard baking, cleaning processes, and/or any suitable process. Subsequently, a patterning process may be performed to remove the portions of the dielectric layer 220 which are not covered by the patterned photoresist layer PR2 until the sensing film 210 are accessibly revealed. In some embodiments, an etching process is performed to remove the portions of the dielectric layer 220 which are not covered by the patterned photoresist layer PR2. After the patterning process of the dielectric layer 220 is performed, a patterned dielectric layer 2202 including a first sensing well 222a and second sensing wells 222b defined therein is formed on the sensing film 210. The first sensing portion 210a may be accessibly revealed by the first sensing well 222a, and the recessed region 210ar of the first sensing portion 210a is within the first sensing well 222a. Each of the second sensing portions 210b may be accessibly revealed by one of the second sensing wells 222b.

Referring to FIG. 14A, a cover 170 including fluid channels 172 may be disposed over the patterned dielectric layer 2202. A semiconductor structure 10A is then provided. For example, the semiconductor structure 10A includes a biosensor including the sensor S1, the patterned dielectric layer 2202 with the first and second sensing wells 222a and 222b, and the cover 170 disposed on the patterned dielectric layer 2202. The sensor S1 includes the bio-sensing device 150a and the voltage-reference devices 150b disposed at opposing sides of the bio-sensing device 150a. The bio-sensing device 150a includes the first FET 140a and the first sensing portion 210b of the sensing film 210 which is capacitively coupled to the first FET 140a. The recessed region 210ar of the first sensing portion 210a may have a maximum depth DP2 with respect to the substantially flat upper surface 210f of the sensing film 210, and the maximum depth DP2 may terminate at the bottommost point of the curved surface 210s of the sensing film 210, where the maximum depth DP2 is non-zero. In some embodiments, the maximum depth DP2 is about 1/10 (or more than 1/10) of the maximum thickness 100H of the semiconductor substrate 100'. The values of the maximum depth DP2, the curvature of the curved surface 210s, and the thickness of the sensing film 210 are designed depending on product requirements.

Each of the voltage-reference devices 150b may include the second FET 140b and the second sensing portion 210b of the sensing film 210 which is capacitively coupled to the second FET 140b. The fluid channels 172 of the cover 170 may be distributed at the inner surface of the cover 170, and the fluid channels 172 of the cover 170 are in communication with the first and second sensing wells 222a and 222b formed in the patterned dielectric layer 2202. The fluid channels 172 of the cover 170 may guide and filtrate the capture reagent applied to the biosensor. Capture reagents are applied to the biosensor, the fluid channels 172 filtrate and guide the applied capture reagents to the sensor S1. The applied capture reagents immobilize the sensing portions (e.g., 210a and 210b) of the sensing film 210 such that sensing regions act as surface receptors to detect the presence of a target analyte of biological origin.

During detecting the presence of a target analyte of biological origin, the gate electrode 134b1, S/D regions 138b1 and the first and third regions 100R1 and 100R3 of the semiconductor substrate 100 are electrically connected to a reference voltage through the interconnect conductors (not individually shown) embedded in the interconnect structure 160. Take the detection data measured from the voltage-reference device 150b as a reference, the detection data measured from the bio-sensing device 150a may be more reliable. Accordingly, the sensor S1 may detect the presence of a target analyte of biological origin precisely. When the target biomolecule is bonded to the gate or the immobilized receptor, the drain current of the bio-sensing device is varied by the gate potential, which depends on the type and amount of target bound. This change in the drain current can be measured and used to determine the type and amount of bonding between the receptor and the target biomolecule. Since the first sensing portion 210a of the sensing film 210 is concave toward the first FET 140a of the bio-sensing device 150a, the biomolecules may be placed close enough to the first FET 140a of the bio-sensing device 150a to have much higher sensitivity than the bio-sensing device 150a having the biomolecules placed on the flat sensing portion.

Referring to FIG. 14B and with reference to FIG. 14A, it should be noted that the top view of FIG. 14B only shows the relative position of the bio-sensing device 150a and the voltage-reference devices 150b, and other features of the semiconductor structure are omitted for clarity purposes. In addition, FIG. 14A shows the cross-sectional configuration of the bio-sensing device 150a and the voltage-reference devices 150b taken along the dotted line A-A' of FIG. 14B.

As illustrated in FIGS. 14A-14B, the sensor S1 includes the bio-sensing device 150a and two voltage-reference devices 150b disposed at opposing sides of the bio-sensing device 150a. It should be noted that a single voltage-reference device 150b or more than two voltage-reference devices 150b may be configured to form the sensor. In the top view, the bio-sensing device 150a may be surrounded by the isolation structure 102a which separates the bio-sensing device 150a from the voltage-reference devices 150b. The isolation structure 102b may at least partially surround the voltage-reference devices 150b. The isolation structures 102 (e.g., 102a and/or 102b) may have a substantially rectangular (or rounded rectangular) top-view shape; however, the isolation structure 102 (e.g., 102a and/or 102b) may be arranged to form a ring, oval, square, polygon, or other shape from the top view. For example, in the top view, the boundary line of the bio-sensing device 150a is defined by the bottom surfaces 102ab (e.g., wider ends) of the isolation structures 102a, and the boundary line of the bio-sensing device 150a is spaced apart from the boundary line of the voltage-reference device 150b by the bottom surface 102ab of the isolation structure 102a having a lateral dimension D1, where the lateral dimension D1 is non-zero. It should be noted that the arrangement of the bio-sensing device 150a and the voltage-reference devices 150b is merely for illustration, other arrangements may be implemented.

Referring to FIG. 14C and with reference to FIGS. 14A-14B, the top view of FIG. 14C only shows the relative position of the bio-sensing device 150a and a plurality of voltage-reference devices 150b, and other features of the semiconductor structure 10A are omitted for clarity purposes. In addition, FIG. 14A shows the cross-sectional configuration of the bio-sensing device 150a and two of the voltage-reference devices 150b taken along the dotted line A-A' of FIG. 14C. The configuration of FIG. 14C is similar to the configuration of FIG. 14B, except that the voltage-reference devices 150b are distributed at four sides of the bio-sensing device 150a. For example, in the top view, four voltage-reference devices 150b are respectively disposed on the left side, the right side, the top side, and the bottom side of the bio-sensing device 150a. In some embodiments, the centers of two of the voltage-reference devices 150b disposed on the left and right sides of the bio-sensing device 150a are substantially aligned with the center of the bio-sensing device 150a along the X-direction, from the top view. Similarly, the centers of two of the voltage-reference devices 150b disposed on the top and bottom sides of the bio-sensing device 150a may be substantially aligned with the center of the bio-sensing device 150a along the Y-direction, from the top view.

Figure 15:
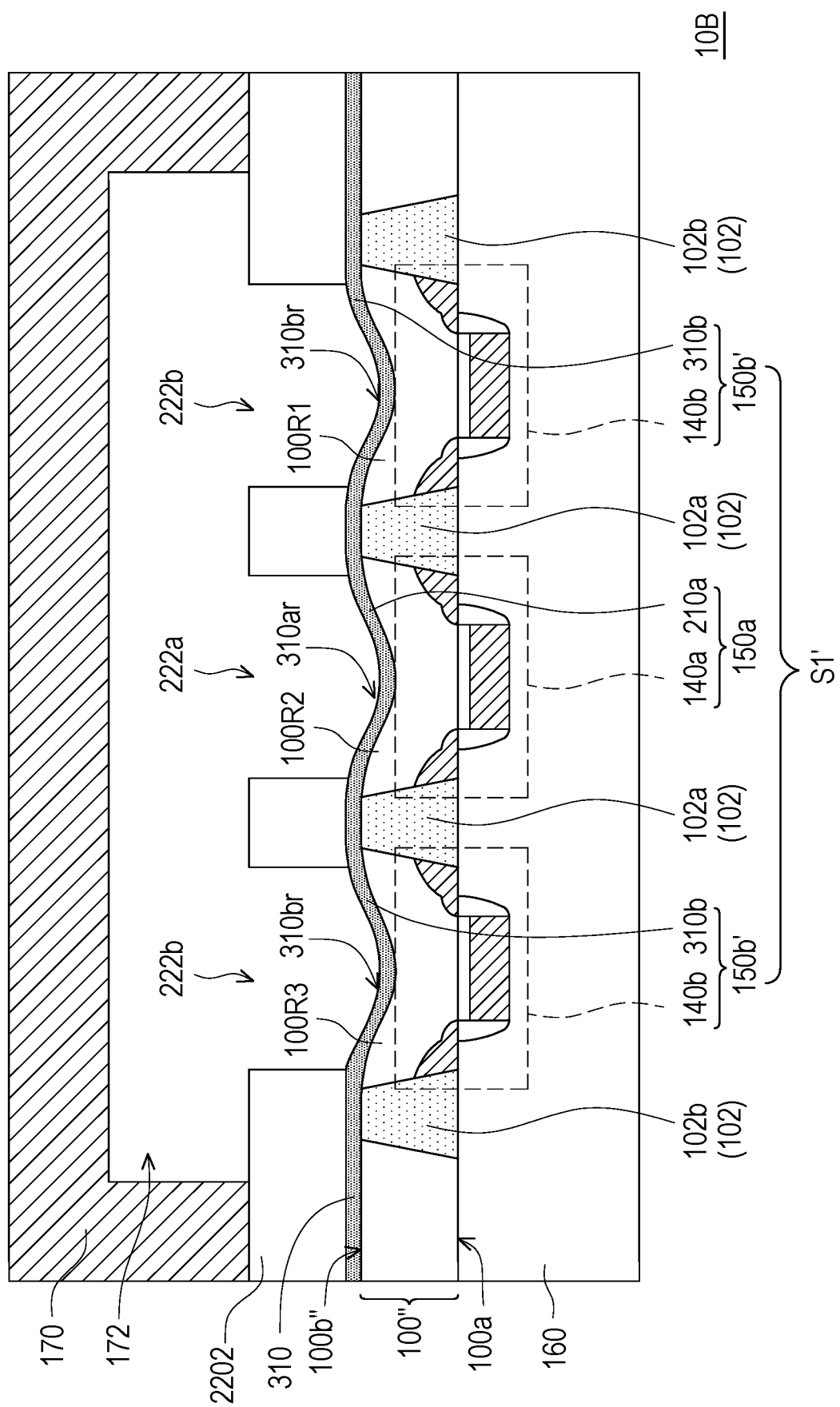
FIGS. 15 and 16A are schematic cross-sectional views illustrating various semiconductor structures, in accordance with some embodiments.

FIG. 15 is a schematic cross-sectional view illustrating a semiconductor structures, in accordance with some embodiments. Unless specified otherwise, the materials and the formation methods of the components in these embodiments are essentially the same as the like components, which are denoted by like reference numerals in the embodiments.

Referring to FIG. 15 and with reference to FIG. 14A, a semiconductor structure 10B is similar to the semiconductor structure 10A described in FIG. 14A, and thus the detailed descriptions are not repeated for the sake of brevity. The difference between the semiconductor structure 10B and the semiconductor structure 10A includes that a sensor S1' including the bio-sensing device 150a and the voltage-reference devices 150b' disposed on opposing sides of the bio-sensing device 150a, each of the voltage-reference devices 150b' includes a second sensing portion 310b of a sensing film 310 and the underlying second FET 140b. The sensing film 310 may include the first sensing portion 210a and second sensing portions 310b which all have a concave profile in the cross-sectional view. In some embodiments, a first recessed region 310ar is located over the first sensing portion 210a above the bio-sensing device 150a, and second recessed regions 310br located over the second sensing portions 310b above the voltage-reference devices 150b. The first recessed region 310ar and the second recessed regions 310br may be formed during the same step(s).

In some embodiments, each of the first region 100R1, the second region 100R2, and the third region 100R3 has a recessed portion recessed into the second surface 100b" of the semiconductor substrate 100". The sensing film 310 conformally covers the second surface 100b" of the semiconductor substrate 100", so that the first recessed region 310ar of the sensing film 310 corresponds to the recessed portion located on the second region 100R2 of the semiconductor substrate 100", the second recessed regions 310br of the sensing film 310 respectively correspond to the recessed portion located on the first region 100R1 and the third region 100R3 of the semiconductor substrate 100". The patterned dielectric layer 2202 of the semiconductor structure 10B may include the first sensing well 222a corresponding to the first recessed region 310ar of the sensing film 310 and the second sensing wells 222b corresponding to the second recessed regions 310br of the sensing film 310.

Figure 16A:
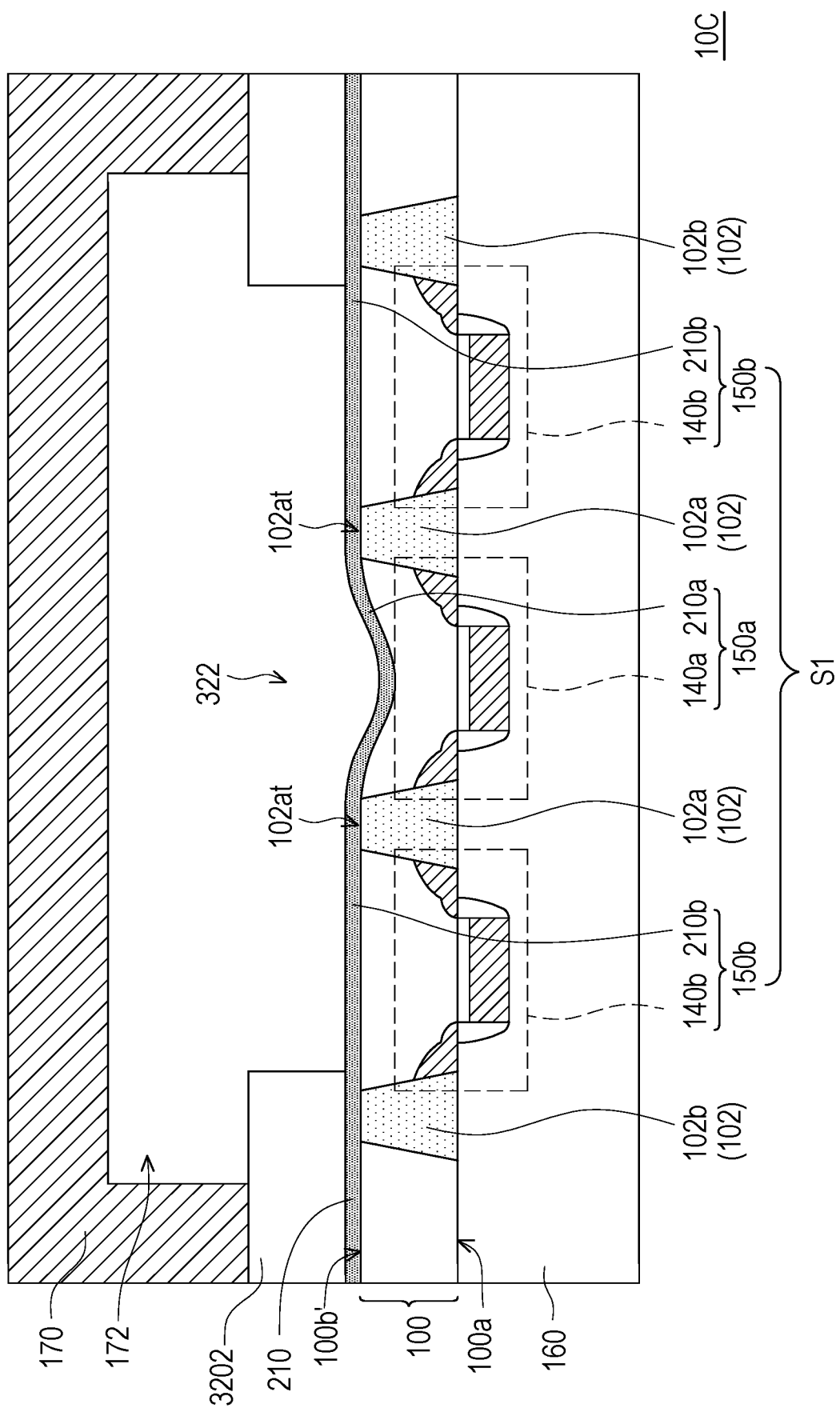
Figure 16D:
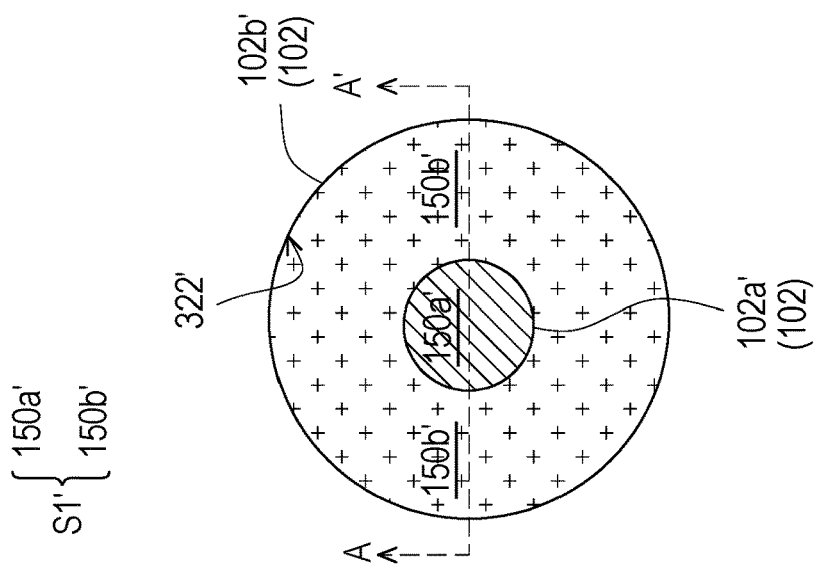
FIGS. 16B-16D are schematic and simplified top views illustrating various configuration of the structure of FIG. 16A, in accordance with some embodiments.
Figure 16C:
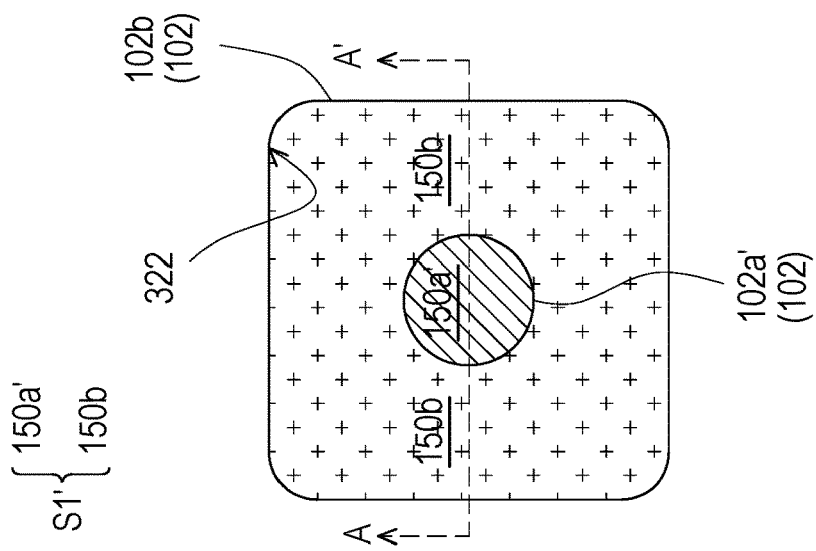
Figure 16B:
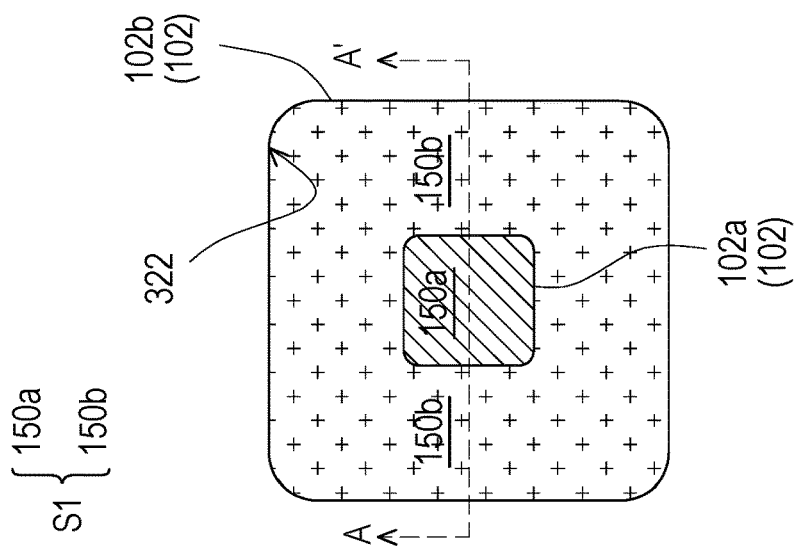

FIG. 16 is a schematic cross-sectional view illustrating a semiconductor structures, and FIGS. 16B-16D are schematic and simplified top views illustrating various configuration of the structure of FIG. 16A, in accordance with some embodiments. Unless specified otherwise, the materials and the formation methods of the components in these embodiments are essentially the same as the like components, which are denoted by like reference numerals in the embodiments.

Referring to FIGS. 16A-16B and with reference to FIGS. 14A-14B, a semiconductor structure 10C is similar to the semiconductor structure 10A described in FIG. 14A, and thus the detailed descriptions are not repeated for the sake of brevity. The difference between the semiconductor structure 10C and the semiconductor structure 10A includes that a sensing well 322 of a patterned dielectric layer 3202 is located right over the bio-sensing device 150a, the voltage-reference devices 150b, and the isolation structure 102a. For example, the top surface 102at of the isolation structure 102a is covered by a portion of the sensing film 210, while the portion of the sensing film 210 is accessibly exposed by the sensing well 322. A portion of the sensing well 322 located right over the bio-sensing device 150a and another portion of the sensing well 322 located right over the voltage-reference devices 150b may be laterally in communication with each other. In the top view of FIG. 16B, the sensing well 322 of the patterned dielectric layer 3202 may have a substantially rectangular (or rounded rectangular) top-view shape; however, the sensing well 322 may be arranged to form a ring, oval, square, polygon, or other shape from the top view.

In some embodiments, the inner sidewall of the patterned dielectric layer 3202 which defines the sensing well 322 may be vertically and substantially aligned with the intersection of the inner sidewall 102bi of the isolation structure 102b and the bottom surface of the isolation structure 102b, and thus the boundary line of the sensing well 322 is substantially aligned with the boundary line of the isolation structure 102b from the top view. FIG. 16A shows the cross-sectional configuration of the bio-sensing device 150a and the voltage-reference devices 150b taken along the dotted line A-A' of FIG. 16B. As shown in FIGS. 16A-16B, two of the voltage-reference devices 150b are disposed at the opposing sides of the bio-sensing device 150a. In the top view, the boundary line of the bio-sensing device 150a may be defined by the isolation structure 102a, and the boundary line of the area on which the voltage-reference devices 150b are disposed may be defined by the isolation structure 102b and encircles the boundary line of the bio-sensing device 150a. For example, in the top view, the orthographic projection area of the boundary line of the bio-sensing device 150a is located within the orthographic projection area of the boundary line of the area on which the voltage-reference devices 150b are disposed.

Referring to FIGS. 16C-16D, the top views of FIGS. 16C-16D are similar to the top view of FIG. 16B. The difference between the top views of FIGS. 16C and 16B includes that the boundary line of the bio-sensing device 150a' of the sensor S1' may have a substantially circular top-view shape. In some embodiments, a configuration of the isolation structure 102a', such as a circular arrangement, is formed around the bio-sensing device 150a'. For example, the path of continuous ring formed by the isolation structures 102a' may have a substantially circular ring shape corresponding to the boundary line of the bio-sensing device 150a'. The boundary line of the voltage-reference devices 150b defined by the isolation structure 102b may be of a rectangular-like shape from the top view. The circular configuration may prevent bubbles from accumulating in corners when the chemical fluids is applied.

In some embodiments, the sensor S1" includes the bio-sensing device 150a' and the voltage-reference devices 150b', where the boundary line of the area on which the voltage-reference devices 150b' are disposed may be formed in the circular arrangement. For example, the boundary line of the voltage-reference devices 150b' defined by the isolation structure 102b' may have a substantially circular top-view shape, as illustrated in FIG. 16D. In some embodiments where the boundary line of the sensing well 322' is substantially aligned with the boundary line of the isolation structure 102b', the boundary line of the sensing well 322' may also have a substantially circular top-view shape. The boundary line of the voltage-reference devices 150b', the ring defined by the isolation structure 102b', and the boundary line of the bio-sensing device 150a' may be concentric. Again, the arrangements of the bio-sensing device, the voltage-reference devices, and the thermal management devices provided herein are merely for illustration, other arrangements may be implemented.

According to some embodiments, a semiconductor structure includes a sensor, a patterned dielectric layer, and a cover disposed on the patterned dielectric layer. The sensor includes a bio-sensing device and at least one voltage-reference device disposed in proximity to the bio-sensing device. The bio-sensing device includes a first field effect transistor (FET) and a first sensing portion of a sensing film capacitively coupled to the first FET, and the first sensing portion is concave toward the first FET. The at least one voltage-reference device includes a second FET and a second sensing portion of the sensing film capacitively coupled to the second FET. The patterned dielectric layer is disposed on the sensing film and includes at least one sensing well located above the at least one voltage-reference device and the bio-sensing device. The cover includes fluid channels communicating with the at least one sensing wells.

According to some alternative embodiments, a semiconductor structure includes a semiconductor substrate, a sensor in the semiconductor substrate, a patterned dielectric layer, and a cover. The semiconductor substrate includes a first region and a second region insulated from the first region, and the first region includes a recess. The sensor includes a bio-sensing device disposed on the first region of the semiconductor substrate and at least one voltage-reference device disposed on the second region of the semiconductor substrate. The bio-sensing device includes a first field effect transistor (FET) and a first sensing portion of a sensing film capacitively coupled to the first FET, and the first sensing portion conformally covers the recess on the first region. The at least one voltage-reference device includes a second FET and a second sensing portion of the sensing film capacitively coupled to the second FET. The patterned dielectric layer includes at least one sensing well corresponding to the at least one voltage-reference device and the bio-sensing device. The cover includes fluid channels communicating with the at least one sensing wells.

According to some alternative embodiments, a manufacturing method of a semiconductor structure includes at least the following steps. A first field effect transistor (FET) and a second FET are respectively formed on a first region and a second region of a semiconductor substrate. A recess is formed on the first region of the semiconductor substrate. A sensing film is formed on the first region and the second region of the semiconductor substrate, where a first sensing portion of the sensing film conformally covers the recess on the first region and is capacitively coupled to the first FET, and a second sensing portion of the sensing film is formed on the second region and capacitively coupled to the second FET. A patterned dielectric layer with at least one sensing well is formed on the sensing film, where the at least one sensing well corresponds to the first sensing portion and the second sensing portion of the sensing film. A cover is disposed on the patterned dielectric layer, where the cover includes fluid channels communicating with the at least one sensing wells.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:
    a sensor comprising:
        a bio-sensing device comprising a first field effect transistor (FET) and a first sensing portion of a sensing film capacitively coupled to the first FET, the first sensing portion being concave toward the first FET; and
        at least one voltage-reference device disposed in proximity to the bio-sensing device, the at least one voltage-reference device comprising a second FET and a second sensing portion of the sensing film capacitively coupled to the second FET, wherein the second sensing portion of the sensing film is relatively flat as compared to the first sensing portion;
    a patterned dielectric layer disposed on the sensing film and comprising at least one sensing well located above the at least one voltage-reference device and the bio-sensing device; and
    a cover disposed on the patterned dielectric layer and comprising fluid channels communicating with the at least one sensing wells.

2. The semiconductor structure of claim 1, further comprising:
    a semiconductor substrate comprising a first region and a second region, the first FET being disposed on the first region, and the second FET being disposed on the second region, wherein the first region comprises a dent on which the first sensing portion of the sensing film is disposed.

3. The semiconductor structure of claim 2, further comprising:
    an isolation structure penetrating through the semiconductor substrate, wherein the first FET is laterally spaced apart from the second FET by a lateral distance resulted from the isolation structure.

4. The semiconductor structure of claim 2, wherein the first sensing portion of the sensing film comprises a recess having a maximum depth, and the maximum depth is at least about $1/10$ of a maximum thickness of the semiconductor substrate.

5. The semiconductor structure of claim 1, wherein the at least one voltage-reference device comprises a plurality of voltage-reference devices disposed on opposing sides of the bio-sensing device in a top view.

6. The semiconductor structure of claim 1, wherein the second sensing portion of the sensing film comprises a concave curved cross-sectional profile.

7. The semiconductor structure of claim 1, wherein the at least one sensing well of the patterned dielectric layer comprises a first sensing well corresponding to the first FET and a second sensing well corresponding to the second FET, and the first sensing well is isolated from the second sensing well.

8. The semiconductor structure of claim 1, wherein a recessed depth of the first sensing portion of the sensing film increases from a region above a periphery of the first FET toward another region above a center of the first FET.

9. The semiconductor structure of claim 1, wherein source/drain regions of the first FET are closer to the first sensing portion of the sensing film than a gate of the first FET.

10. The semiconductor structure of claim 1, further comprising:
    an isolation structure disposed in the semiconductor substrate and surrounding the first FET, the isolation structure being tapered toward the sensing film.

11. The semiconductor structure of claim 1, further comprising:
    an interconnect structure electrically coupled to the bio-sensing device and the at least one voltage-reference device, wherein the sensing film and the interconnect structure are disposed on opposing sides of the first FET.

12. A semiconductor structure, comprising:
    a semiconductor substrate comprising a first region and a second region insulated from the first region, and the first region comprising a recess;
    a sensor in the semiconductor substrate and comprising:
        a bio-sensing device disposed on the first region of the semiconductor substrate, the bio-sensing device comprising a first field effect transistor (FET) and a first sensing portion of a sensing film capacitively coupled to the first FET, the first sensing portion conformally covering the recess on the first region;
        at least one voltage-reference device disposed on the second region of the semiconductor substrate, the at least one voltage-reference device comprising a second FET and a second sensing portion of the sensing film capacitively coupled to the second FET, wherein the second sensing portion of the sensing film is relatively flat as compared to the first sensing portion;
    a patterned dielectric layer comprising at least one sensing well corresponding to the at least one voltage-reference device and the bio-sensing device; and
    a cover comprising fluid channels communicating with the at least one sensing wells.

13. The semiconductor structure of claim 12, wherein the recess of the first region comprises a concave curved cross-sectional profile.

14. The semiconductor structure of claim 12, further comprising:
    a first isolation structure penetrating through the semiconductor substrate and separating the first region from the second region, wherein the first FET of the bio-sensing device is surrounded by the first isolation structure.

15. The semiconductor structure of claim 14, further comprising:
    a second isolation structure penetrating through the semiconductor substrate and spaced apart from the first isolation structure, wherein a boundary line of the at least one voltage-reference device is defined by the second isolation structure.

16. The semiconductor structure of claim 15, wherein the first and second isolation structures are tapered toward the sensing film.

17. The semiconductor structure of claim 12, wherein first sensing portion of the sensing film comprises a recess corresponding to the recess of the semiconductor substrate, and a maximum depth of the recess of the first sensing portion is at least about $1/10$ of a maximum thickness of the semiconductor substrate.

18. A manufacturing method of a semiconductor structure, comprising:
    forming a first field effect transistor (FET) and a second FET on a first region and a second region of a semiconductor substrate, respectively;

forming a recess on the first region of the semiconductor substrate;

forming a sensing film on the first region and the second region of the semiconductor substrate, wherein a first sensing portion of the sensing film conformally covers the recess on the first region and is capacitively coupled to the first FET, a second sensing portion of the sensing film is formed on the second region and capacitively coupled to the second FET, and the second sensing portion of the sensing film is relatively flat as compared to the first sensing portion;

forming a patterned dielectric layer with at least one sensing well on the sensing film, wherein the at least one sensing well corresponds to the first sensing portion and the second sensing portion of the sensing film; and disposing a cover on the patterned dielectric layer, wherein the cover comprises fluid channels communicating with the at least one sensing wells.

19. The manufacturing method of claim 18, wherein:

forming the first FET and the second FET on a first surface of the semiconductor substrate; and forming the recess on a second surface of the semiconductor substrate opposite to the first surface, after forming the first FET and the second FET.

20. The manufacturing method of claim 18, further comprising:

forming an interconnect structure on the semiconductor substrate to cover the first FET and the second FET before forming the recess; and flipping over the semiconductor substrate to form the recess.

* * * * *